United States Patent
Hatakeyama et al.

(10) Patent No.: US 10,125,202 B2
(45) Date of Patent: *Nov. 13, 2018

(54) POLYMER COMPOUND FOR A CONDUCTIVE POLYMER AND METHOD FOR PRODUCING SAME

(71) Applicant: SHIN-ETSU CHEMICAL CO., LTD., Tokyo (JP)

(72) Inventors: Jun Hatakeyama, Jyoetsu (JP); Masaki Ohashi, Jyoetsu (JP); Takayuki Nagasawa, Jyoetsu (JP); Koji Hasegawa, Jyoetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/230,684

(22) Filed: Aug. 8, 2016

(65) Prior Publication Data
US 2017/0058059 A1  Mar. 2, 2017

(30) Foreign Application Priority Data

Aug. 25, 2015 (JP) .................. 2015-165938
Jan. 25, 2016 (JP) .................. 2016-011215

(51) Int. Cl.

| | | |
|---|---|---|
| C08F 220/38 | (2006.01) | |
| C08F 20/38 | (2006.01) | |
| C08F 214/18 | (2006.01) | |
| C08F 122/24 | (2006.01) | |
| C08F 128/02 | (2006.01) | |
| C08F 120/22 | (2006.01) | |
| C08F 120/38 | (2006.01) | |
| C08F 222/24 | (2006.01) | |
| C08F 114/18 | (2006.01) | |
| C08F 228/02 | (2006.01) | |
| C08F 220/22 | (2006.01) | |
| C08F 212/14 | (2006.01) | |
| H01B 1/12 | (2006.01) | |
| C08F 12/30 | (2006.01) | |
| C08F 12/22 | (2006.01) |

(Continued)

(52) U.S. Cl.
CPC ............ *C08F 20/38* (2013.01); *C08F 114/18* (2013.01); *C08F 120/22* (2013.01); *C08F 120/38* (2013.01); *C08F 122/24* (2013.01); *C08F 128/02* (2013.01); *C08F 212/14* (2013.01); *C08F 214/18* (2013.01); *C08F 220/22* (2013.01); *C08F 220/38* (2013.01); *C08F 222/24* (2013.01); *C08F 228/02* (2013.01); *H01B 1/125* (2013.01); C08F 12/20 (2013.01); C08F 12/22 (2013.01); C08F 12/30 (2013.01); C08F 14/18 (2013.01); C08F 18/20 (2013.01); *C08F 20/22* (2013.01); *C08F 22/24* (2013.01); *C08F 28/02* (2013.01); *C08F 212/32* (2013.01)

(58) Field of Classification Search
CPC ........ C08F 20/38; C08F 20/22; C08F 120/38; C08F 120/22; C08F 220/38; C08F 220/22; C08F 2220/382; C08F 14/18; C08F 114/18; C08F 214/18; C08F 18/20; C08F 22/24; C08F 122/24; C08F 222/24; C08F 28/02; C08F 128/02; C08F 228/02
See application file for complete search history.

(56) References Cited

U.S. PATENT DOCUMENTS 8,283,104 B2 * 10/2012 Ohashi .................... C07C 25/18
                                                        430/270.1
9,752,045 B2 *  9/2017 Hatakeyama ......... H01L 51/442
(Continued)

FOREIGN PATENT DOCUMENTS

JP       2008-146913 A     6/2008

*Primary Examiner* — Ling Siu Choi
*Assistant Examiner* — David L Miller
(74) *Attorney, Agent, or Firm* — Oliff PLC

(57) ABSTRACT

The present invention provides a polymer compound for a conductive polymer comprising one or more repeating units "a" shown by the formula (1), and having a weight-average molecular weight in the range of 1,000 to 500,000. There can be provided a polymer compound for a conductive polymer having a specific superacidic sulfo group which is soluble in an organic solvent, and suitably used for a fuel cell or a dopant for a conductive material.

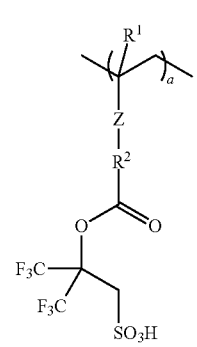

(1)

wherein $R^1$ represents a hydrogen atom or a methyl group; $R^2$ represents any of a single bond, an ester group, and a linear, branched, or cyclic hydrocarbon group having 1 to 12 carbon atoms, the hydrocarbon group optionally containing an ether group, an ester group, or both; "Z" represents any of a single bond, a phenylene group, a naphthylene group, an ether group, and an ester group; and "a" is a number satisfying 0<a≤1.0.

4 Claims, No Drawings

(51) Int. Cl.
    *C08F 18/20*          (2006.01)
    *C08F 14/18*          (2006.01)
    *C08F 22/24*          (2006.01)
    *C08F 20/22*          (2006.01)
    *C08F 28/02*          (2006.01)
    *C08F 212/32*        (2006.01)
    *C08F 12/20*          (2006.01)

(56) References Cited

U.S. PATENT DOCUMENTS

2012/0237876 A1*   9/2012   Maruyama  ............... C08F 12/20
                                                                              430/285.1
2014/0017617 A1*   1/2014   Arai  ...................... G03F 7/0045
                                                                              430/325
2017/0037167 A1*   2/2017   Domon  ................. G03F 7/2059

* cited by examiner

POLYMER COMPOUND FOR A CONDUCTIVE POLYMER AND METHOD FOR PRODUCING SAME

BACKGROUND OF THE INVENTION

Field of the Invention

The present invention relates to a polymer compound for a conductive polymer and a method for producing the same.

Description of the Related Art

A polymer containing a sulfo group has been used as a fuel cell or a dopant polymer for a conductive polymer. As a material for a fuel cell, vinylperfluoroalkyl ether sulfonic acid represented by Nafion (registered trademark) has been widely used, and as a dopant polymer for a conductive polymer, a polymer of vinylsulfonic acid or styrenesulfonic acid has been widely used (Patent Document 1).

The vinylperfluoroalkyl ether sulfonic acid has chemically high stability and excellent durability, but the glass transition point thereof is low, so that there is a problem that when a fuel cell using it is exposed to high temperature, the polymer causes heat flow whereby ion conductivity thereof is lowered. A superacidic polymer having a sulfo group an α-position of which has been fluorinated is effective for enhancing the ion conductivity, but a material having high glass transition point and chemical stability with such a structure has not yet been found out.

Also, a conductive polymer having a conjugated double bond such as a polythiophene, a polyaniline, a polypyrrole, etc., does not exhibit conductivity itself, but conductivity thereof is expressed by doping therein a strong acid such as sulfonic acid, etc. As the dopant, polystyrene sulfonic acid (PSS) has been most frequently used. This is because conductivity becomes the highest by doping PSS.

PSS is a water-soluble resin, and hardly dissolves in an organic solvent. Accordingly, a polythiophene using PSS as a dopant is also water-soluble.

The polythiophene using PSS as a dopant is highly conductive and highly transparent, so that it has been expected to be used as a conductive film for an organic EL lighting in place of ITO (indium-tin oxide). However, a luminous body of the organic EL chemically changes by moisture, thereby stopping to emit a light. That is, when a conductive film composed of a water-soluble resin is used for an organic EL, there is a problem that an emission lifetime of the organic EL becomes short due to the resin containing water.

PRIOR ART DOCUMENTS

Patent Documents

Patent Document 1: Japanese Patent Laid-Open Publication No. 2008-146913

SUMMARY OF THE INVENTION

The present invention has been accomplished in view of the above-described circumstances, and has an object to provide a polymer compound for a conductive polymer having a specific superacidic sulfo group which is soluble in an organic solvent, and suitably used for a fuel cell or a dopant for a conductive material. In addition, the present invention also has an object to provide a method for producing such a polymer compound for a conductive polymer.

To solve the above-mentioned problems, the present invention provides a polymer compound for a conductive polymer comprising one or more repeating units "a" shown by the following general formula (1), and having a weight-average molecular weight in the range of 1,000 to 500,000,

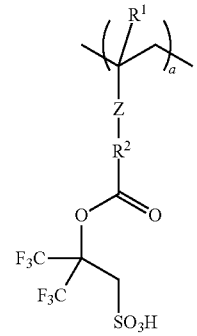

(1)

wherein $R^1$ represents a hydrogen atom or a methyl group; $R^2$ represents any of a single bond, an ester group, and a linear, branched, or cyclic hydrocarbon group having 1 to 12 carbon atoms, the hydrocarbon group optionally containing either or both of an ether group and an ester group; "Z" represents any of a single bond, a phenylene group, a naphthylene group, an ether group, and an ester group; and "a" is a number satisfying $0 < a \leq 1.0$.

Such a polymer compound for a conductive polymer can be a polymer compound for a conductive polymer having a specific superacidic sulfo group which is soluble in an organic solvent, and suitably used for a fuel cell or a dopant for a conductive material.

It is preferred that the polymer compound for a conductive polymer further comprise a repeating unit "b" shown by the following general formula (2),

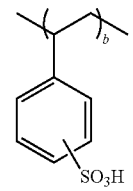

(2)

wherein "b" is a number satisfying $0 < b < 1.0$.

When the repeating unit "a" is copolymerized with the repeating unit "b" which is a repeating unit of the polystyrene sulfonic acid, the polymer compound can be used as a dopant polymer with high conductivity.

The repeating unit "a" shown by the general formula (1) preferably includes one or more kinds selected from repeating units a1 to a4 respectively shown by the following general formulae (3-1) to (3-4),

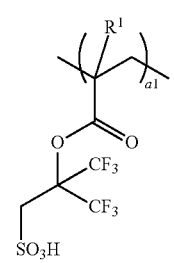

(3-1)

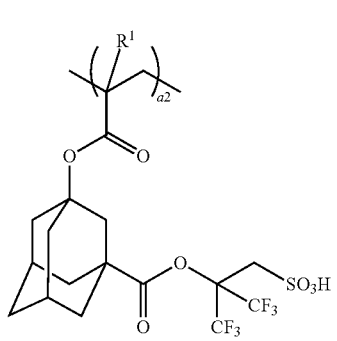
(3-2)

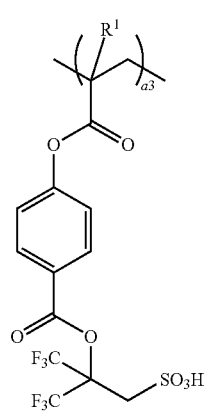
(3-3)

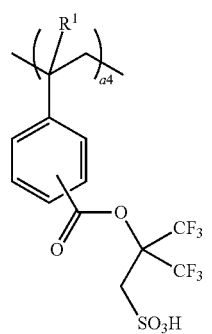
(3-4)

wherein $R^1$ has the same meaning as defined above; and a1, a2, a3, and a4 are each a number satisfying $0 \le a1 \le 1.0$, $0 \le a2 \le 1.0$, $0 \le a3 \le 1.0$, $0 \le a4 \le 1.0$, and $0 < a1+a2+a3+a4 \le 1.0$.

When such repeating units are included, the polymer compound is more suitable for a fuel cell or a dopant for a conductive material.

In addition, the present invention provides a method for producing a polymer compound for a conductive polymer containing a repeating unit "a" shown by the following general formula (1), comprising the steps of:

subjecting to polymerization reaction using a monomer having a structure of a salt composed of a sulfonic acid residue and lithium, sodium, potassium, or a nitrogen compound; and after the polymerization reaction, converting the structure of the salt composed of a sulfonic acid residue and lithium, sodium, potassium, or a nitrogen compound to a sulfo group by ion-exchange,

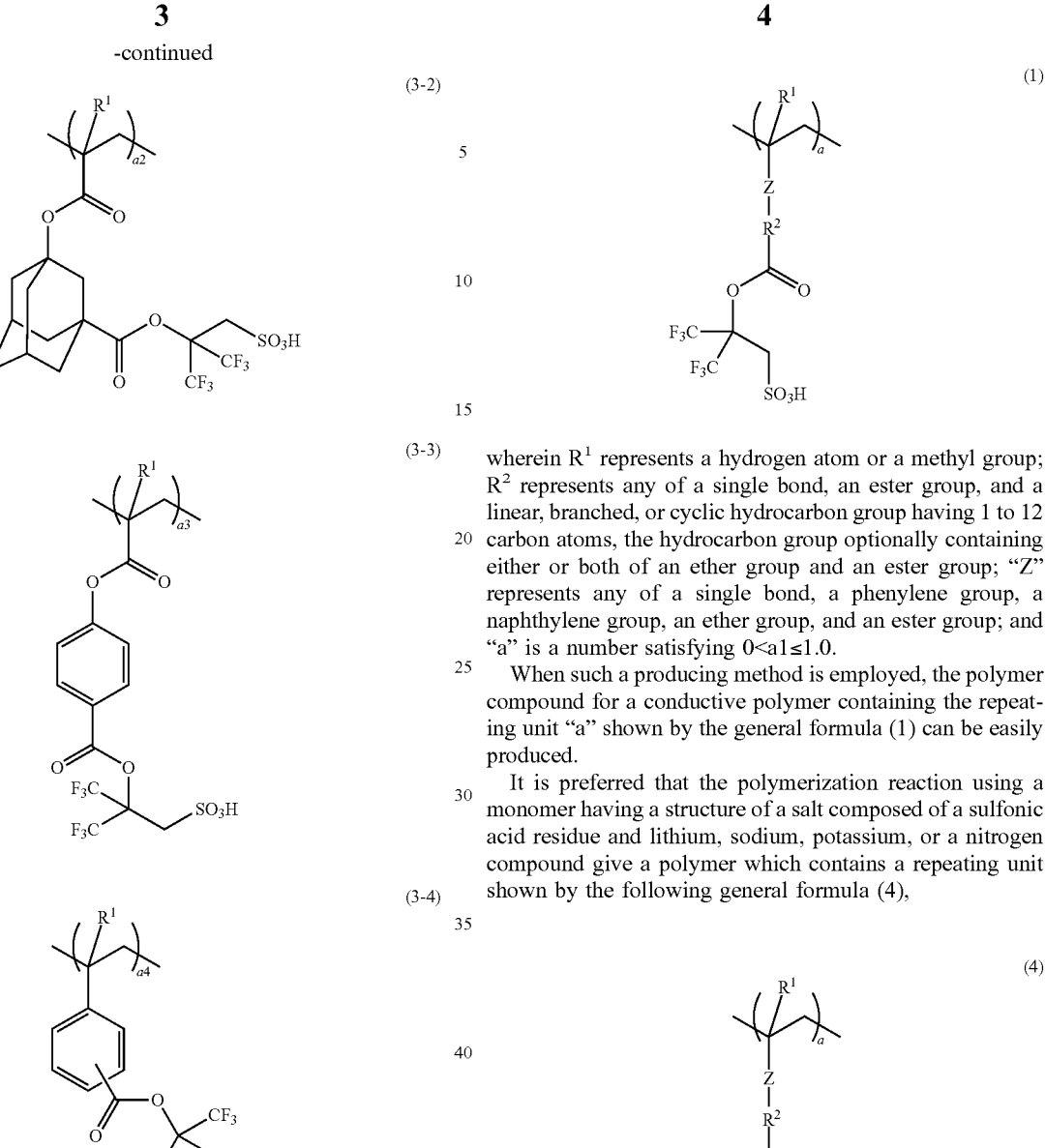

wherein $R^1$ represents a hydrogen atom or a methyl group; $R^2$ represents any of a single bond, an ester group, and a linear, branched, or cyclic hydrocarbon group having 1 to 12 carbon atoms, the hydrocarbon group optionally containing either or both of an ether group and an ester group; "Z" represents any of a single bond, a phenylene group, a naphthylene group, an ether group, and an ester group; and "a" is a number satisfying $0 < a1 \le 1.0$.

When such a producing method is employed, the polymer compound for a conductive polymer containing the repeating unit "a" shown by the general formula (1) can be easily produced.

It is preferred that the polymerization reaction using a monomer having a structure of a salt composed of a sulfonic acid residue and lithium, sodium, potassium, or a nitrogen compound give a polymer which contains a repeating unit shown by the following general formula (4),

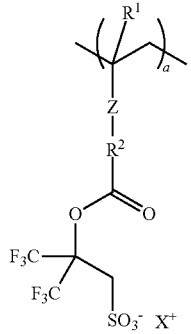
(4)

wherein $R^1$, $R^2$, "Z", and "a" have the same meanings as defined above; and "X" represents lithium, sodium, potassium, or a nitrogen compound shown by the following general formula (5),

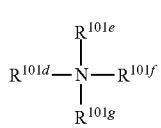
(5)

wherein $R^{101d}$, $R^{101e}$, $R^{101f}$, $R^{101g}$ each represent a hydrogen atom, or a linear, branched, or cyclic alkyl group, alkenyl group, oxoalkyl group, or oxoalkenyl group each having 1 to 12 carbon atoms, an aryl group having 6 to 20 carbon atoms, or an aralkyl group or an aryloxoalkyl group each having 7 to 12 carbon atoms where a part or all of hydrogen atoms in these groups may be substituted by an alkoxy group(s); $R^{101d}$ and $R^{101e}$, or $R^{101d}$, $R^{101e}$, and $R^{101f}$ may form a ring together, and when the ring is formed, $R^{101d}$ and $R^{101e}$, or $R^{101d}$, $R^{101e}$, and $R^{101f}$ represent an alkylene group having 3 to 10 carbon atoms or a heteroaromatic ring having therein the nitrogen atom in the formula.

Such a repeating unit can be easily converted to the repeating unit "a" shown by the general formula (1) by ion-exchange.

As mentioned above, the polymer compound for a conductive polymer of the present invention can be a polymer compound for a conductive polymer having a specific superacidic sulfo group which is soluble in an organic solvent, and suitably used for a fuel cell or a dopant for a conductive material.

When this polymer compound for a conductive polymer is used for a fuel cell, a material for a fuel cell having high dielectric constant can be obtained. Also, when this polymer compound is used as a dopant for a conjugated double bond polymer, a conductive film having high transparency, high conductivity, and high durability can be formed. Since the polymer compound for a conductive polymer of the present invention has a superacidic sulfonic-acid structure, the β-position of which has been substituted with trifluoromethyl groups, it exhibits high performance as a dopant due to the strong ionic bond, and exhibits high stability as an ion. Therefore, when this polymer compound is used as a conductive material, it exhibits high conductivity and high stability. Moreover, it has excellent solubility in an organic solvent, so that deterioration of an organic EL device can be prevented by using it for a conductive film for an organic EL lighting.

Further, the producing method of the present invention facilitates producing such a polymer compound for a conductive polymer of the present invention.

DETAILED DESCRIPTION OF THE PREFERRED EMBODIMENTS

As mentioned above, it has been desired to develop a polymer compound for a conductive polymer having a specific superacidic sulfa group which is soluble in an organic solvent, and suitably used for a fuel cell or a dopant for a conductive material.

For the purpose of changing a water-soluble conductive polymer containing water, which causes the deterioration of an organic EL device, into an organic solvent-soluble polymer containing an extremely little water to prevent the deterioration of the device, the present inventors have tried to develop a polymer for a dopant having high solubility in an organic solvent from polystyrene sulfonic acid, which is a dopant soluble in water but difficultly soluble in an organic solvent. Since it is effective for increasing solubility in an organic solvent to introduce a long-chain alkyl group or fluorine, they have investigated to introduce fluorine, and found out that the problems can be solved particularly by using a polymer compound composed of a repeating unit having a sulfo group, the β-position of which has been substituted with trifluoromethyl groups, thereby bringing the invention to completion.

That is, the present invention is a polymer compound for a conductive polymer comprising one or more repeating units "a" shown by the following general formula (1), and having a weight-average molecular weight in the range of 1,000 to 500,000,

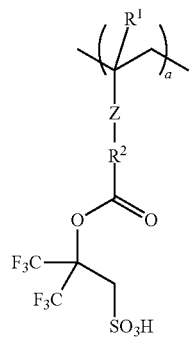

(1)

wherein $R^1$ represents a hydrogen atom or a methyl group; $R^2$ represents any of a single bond, an ester group, and a linear, branched, or cyclic hydrocarbon group having 1 to 12 carbon atoms, the hydrocarbon group optionally containing either or both of an ether group and an ester group; "Z" represents any of a single bond, a phenylene group, a naphthylene group, an ether group, and an ester group; and "a" is a number satisfying 0<a≤1.0.

Hereinafter, the present invention will be described in detail, but the present invention is not limited thereto.

Herein, "conductive" means "electrically conductive."

The inventive polymer compound for a conductive polymer is a polymer which contains one or more repeating units "a" shown by the following general formula (1). The inventive polymer compound for a conductive polymer can have particularly high transparency by containing the repeating units "a" shown by the following general formula (1),

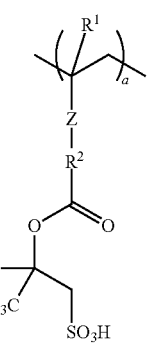

(1)

wherein $R^1$ represents a hydrogen atom or a methyl group; $R^2$ represents any of a single bond, an ester group, and a linear, branched, or cyclic hydrocarbon group having 1 to 12 carbon atoms, the hydrocarbon group optionally containing either or both of an ether group and an ester group; "Z" represents any of a single bond, a phenylene group, a naphthylene group, an ether group, and an ester group; and "a" is a number satisfying 0<a≤1.0.

In the general formula (1), $R^1$ is a hydrogen atom or a methyl group.

$R^2$ is any of a single bond, an ester group, and a linear, branched, or cyclic hydrocarbon group having 1 to 12 carbon atoms, the hydrocarbon group optionally containing either or both of an ether group and an ester group. As the hydrocarbon group, for example, alkylene groups, arylene groups (such as a phenylene group and a naphthylene group), alkenylene groups are mentioned.

"Z" is any of a single bond, a phenylene group, a naphthylene group, an ether group, and an ester group.

"a" is a number satisfying 0<a≤1.0.

It is preferred that the repeating unit "a" shown by the general formula (1) include one or more kinds selected from repeating units a1 to a4 respectively shown by the following general formulae (3-1) to (3-4),

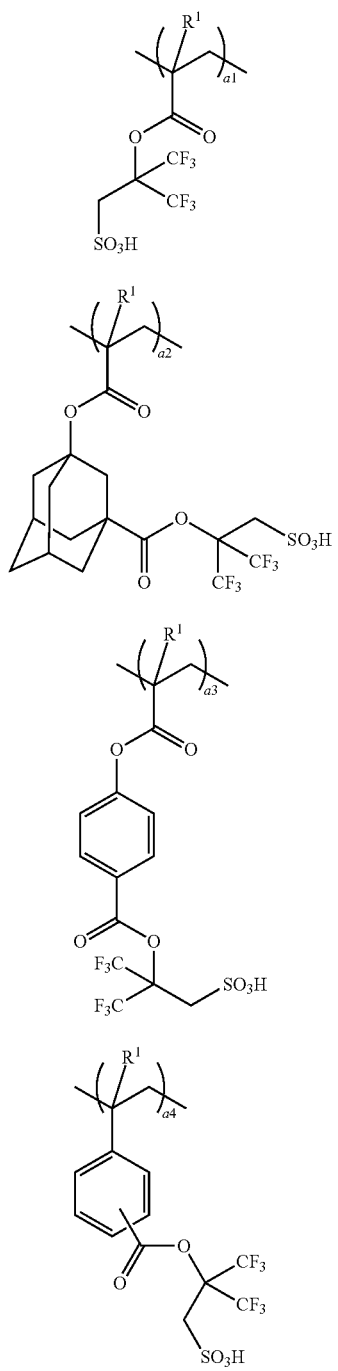

wherein R¹ has the same meaning as defined above; and a1, a2, a3, and a4 are each a number satisfying 0≤a1≤1.0, 0≤a2≤1.0, 0≤a3≤1.0, 0≤a4≤1.0, and 0<a1+a2+a3+a4≤1.0.

When such repeating units are included, the polymer compound is more suitable for a fuel cell or a dopant for a conductive material.

Also, it is preferred that the polymer compound for a conductive polymer of the present invention further contain a repeating unit "b" shown by the following general formula (2). When the repeating unit "a" is copolymerized with the repeating unit "b" which is a repeating unit of the polystyrene sulfonic acid, the polymer compound can be used as a dopant polymer with high conductivity,

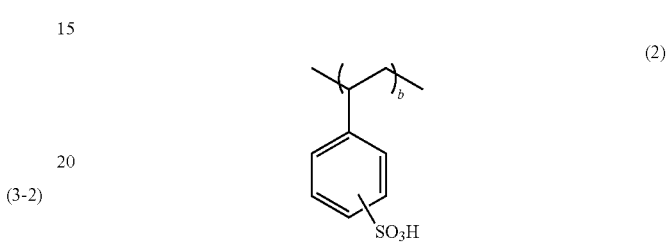

wherein "b" is a number satisfying 0<b<1.0.

Also, as explained later, the polymer compound for a conductive polymer of the present invention may further contain a repeating unit "c" besides the repeating unit "a" and the repeating unit "b".

The polymer compound for a conductive polymer of the present invention has a weight-average molecular weight in the range of 1,000 to 500,000, preferably 2,000 to 200,000. If the weight-average molecular weight is less than 1,000, the polymer compound is inferior in heat resistance. On the other hand, if the weight-average molecular weight exceeds 500,000, its viscosity is increased, workability is worsened, and solubility in an organic solvent and water is lowered.

The weight-average molecular weight (Mw) is a measured value in terms of polystyrene by gel permeation chromatography (GPC) using water, dimethylformamide (DMF), and/or tetrahydrofuran (THF) as a solvent.

The polymer compound for a conductive polymer of the present invention as mentioned above can be a polymer compound for a conductive polymer having a specific superacidic sulfo group which is soluble in an organic solvent, and suitably used for a fuel cell or a dopant for a conductive material.

In addition, the present invention provides a method for producing such a polymer compound for a conductive polymer of the present invention.

That is, the producing method of the present invention is a method for producing a polymer compound for a conductive polymer containing a repeating unit "a" shown by the following general formula (1), comprising the steps of:

subjecting to polymerization reaction using a monomer having a structure of a salt composed of a sulfonic acid residue and lithium, sodium, potassium, or a nitrogen compound; and after the polymerization reaction, converting the structure of the salt composed of a sulfonic acid residue and lithium, sodium, potassium, or a nitrogen compound to a sulfo group by ion-exchange,

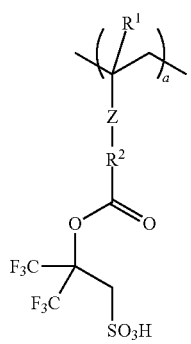

(1)

wherein $R^1$ represents a hydrogen atom or a methyl group; $R^2$ represents any of a single bond, an ester group, and a linear, branched, or cyclic hydrocarbon group having 1 to 12 carbon atoms, the hydrocarbon group optionally containing either or both of an ether group and an ester group; "Z" represents any of a single bond, a phenylene group, a naphthylene group, an ether group, and an ester group; and "a" is a number satisfying $0<a\leq 1.0$.

It is preferred that the polymerization reaction using a monomer having a structure of a salt composed of a sulfonic acid residue and lithium, sodium, potassium, or a nitrogen compound give a polymer which contains a repeating unit shown by the following general formula (4),

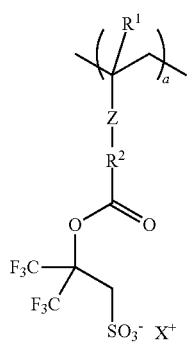

(4)

wherein $R^1$, $R^2$, "Z", and "a" have the same meanings as defined above; and "X" represents lithium, sodium, potassium, or a nitrogen compound shown by the following general formula (5),

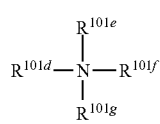

(5)

wherein $R^{101d}$, $R^{101e}$, $R^{101f}$, and $R^{101g}$ each represent a hydrogen atom, or a linear, branched, or cyclic alkyl group, alkenyl group, oxoalkyl group, or oxoalkenyl group each having 1 to 12 carbon atoms, an aryl group having 6 to 20 carbon atoms, or an aralkyl group or an aryloxoalkyl group each having 7 to 12 carbon atoms where a part or all of hydrogen atoms in these groups may be substituted by an alkoxy group(s); $R^{101d}$ and $R^{101e}$, or $R^{101d}$, $R^{101e}$, and $R^{101f}$ may form a ring together, and when the ring is formed, $R^{101d}$ and $R^{101e}$, or $R^{101d}$, $R^{101e}$, and $R^{101f}$ represent an alkylene group having 3 to 10 carbon atoms or a heteroaromatic ring having therein the nitrogen atom in the formula.

Such a repeating unit can be easily converted to the repeating unit "a" shown by the general formula (1) by ion-exchange, thereby being preferable.

The monomer to be used in the producing method of the present invention that has a structure of a salt composed of a sulfonic acid residue and lithium, sodium, potassium, or a nitrogen compound, and can give the repeating unit "a", may be specifically exemplified by the following.

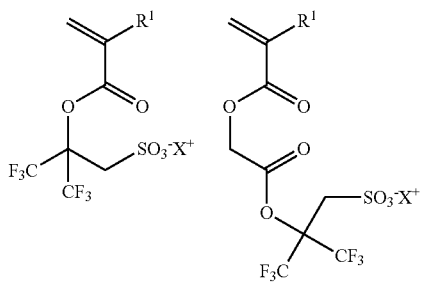

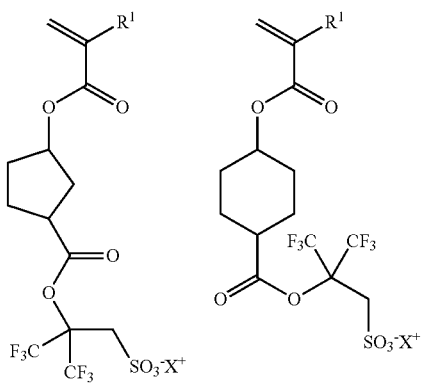

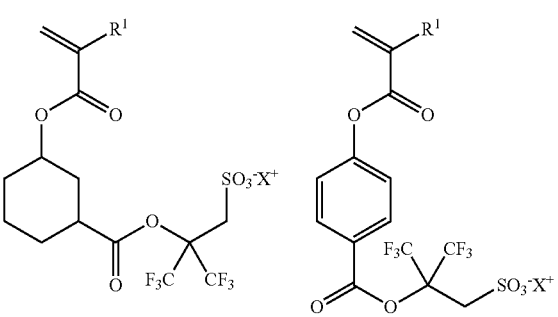

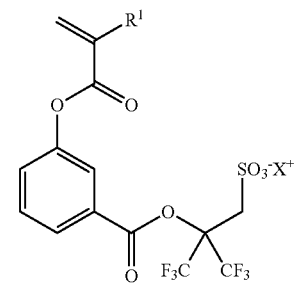

-continued
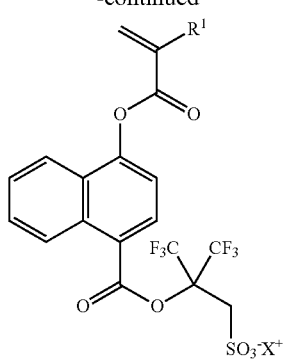
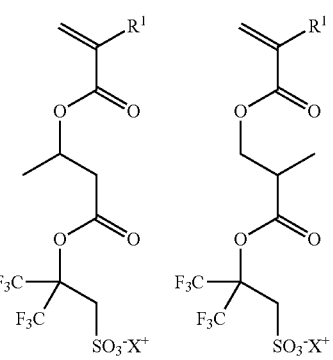
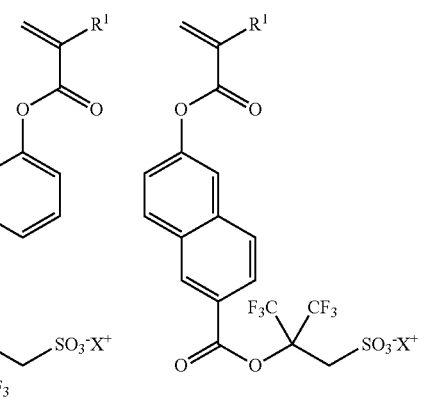
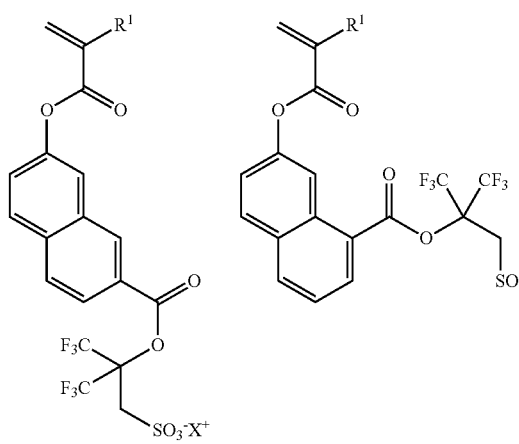
-continued
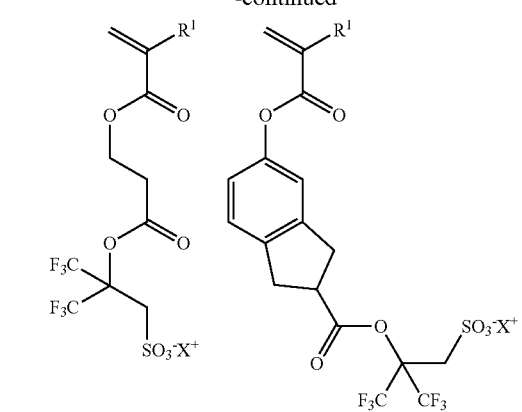
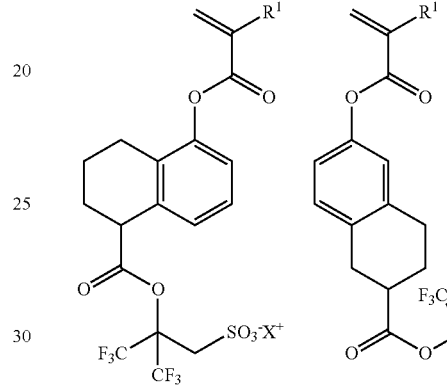
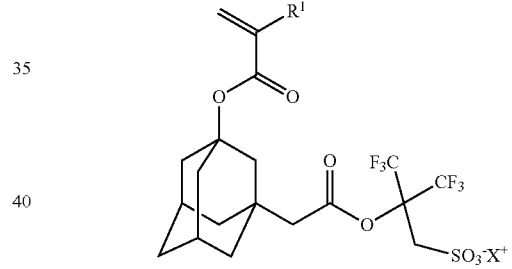
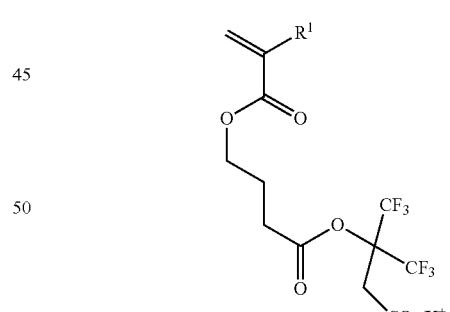
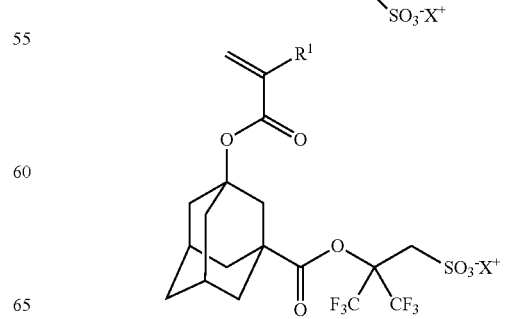

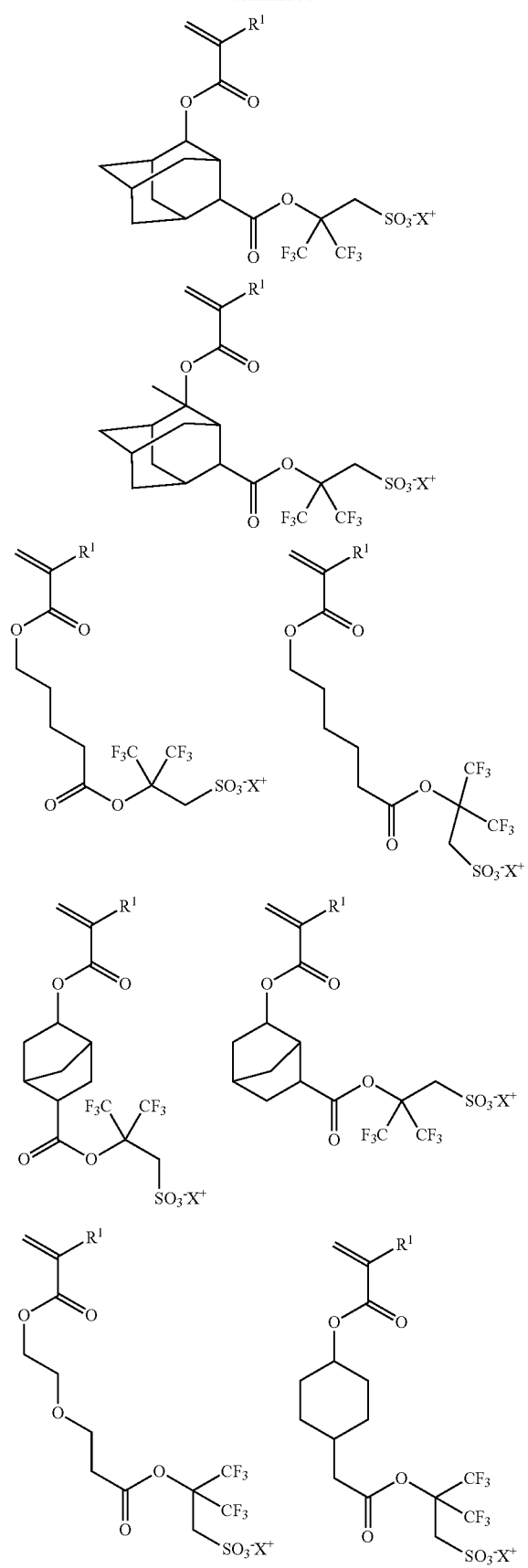
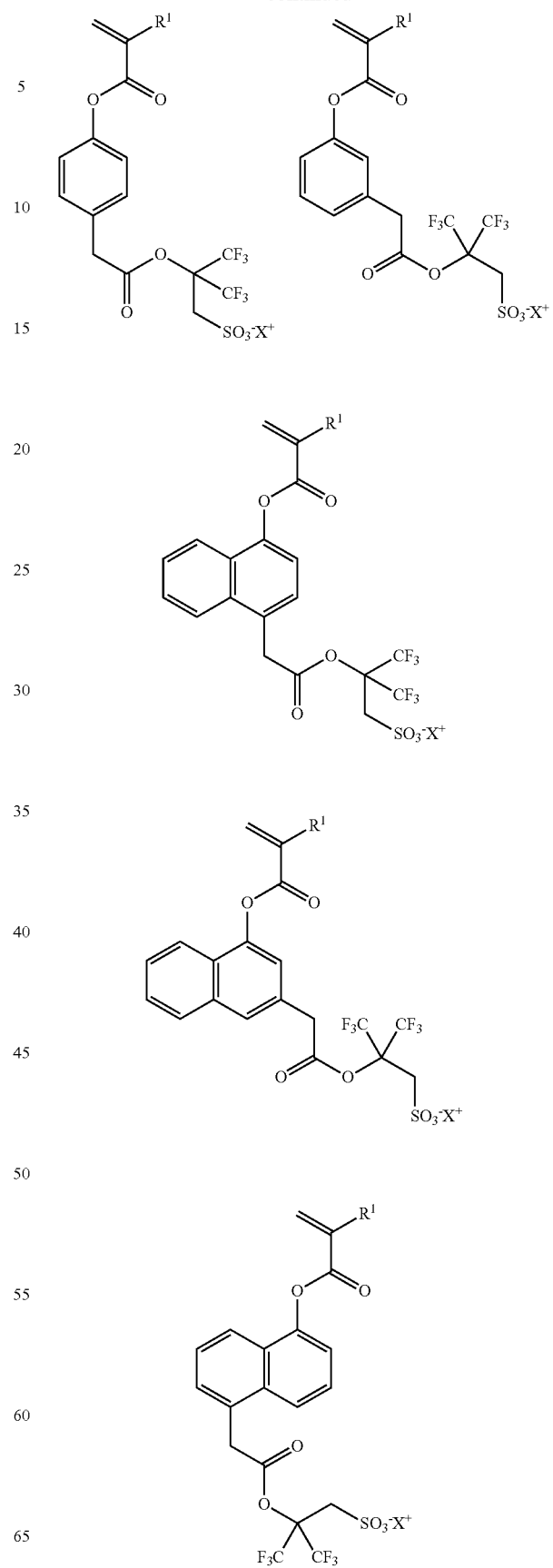

-continued
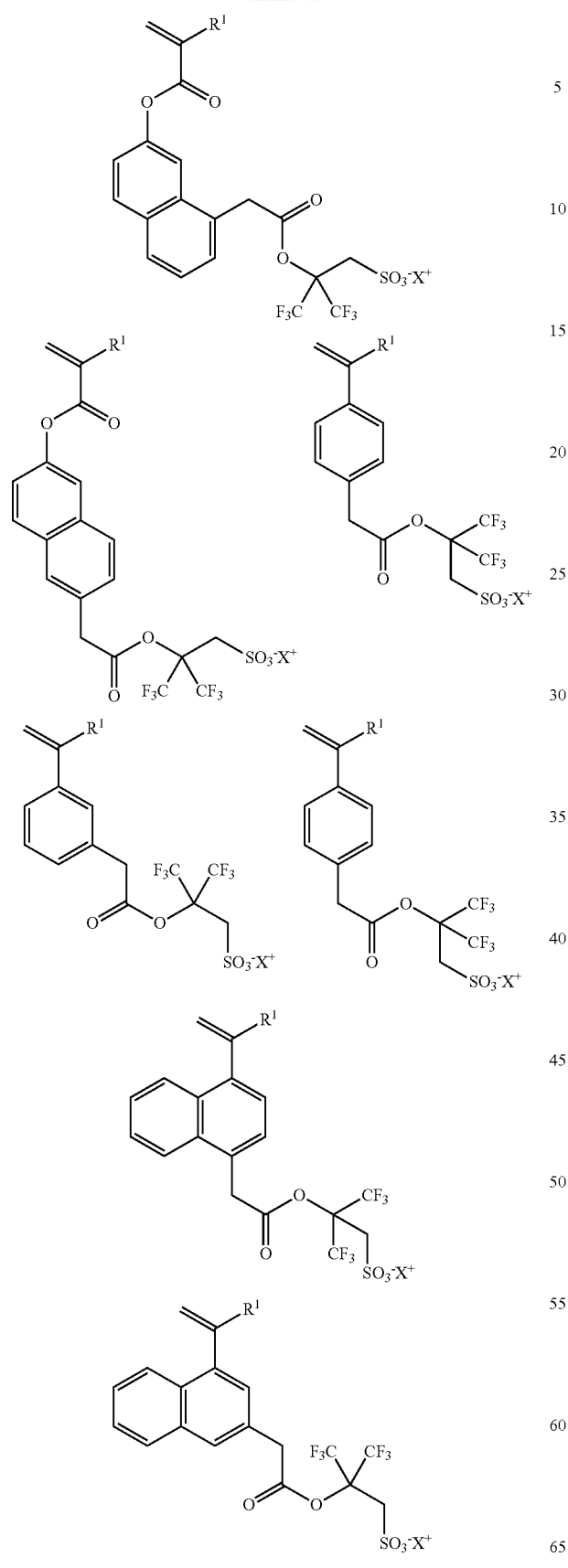
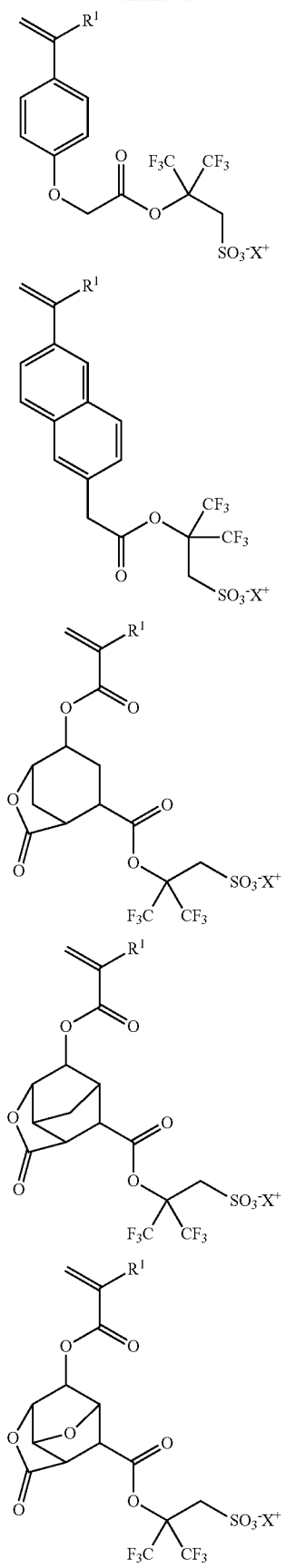

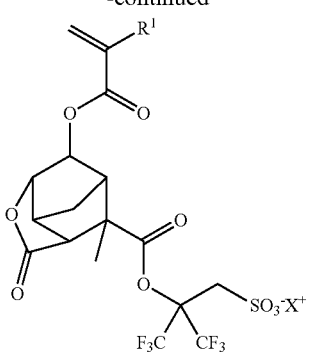
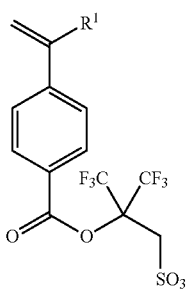
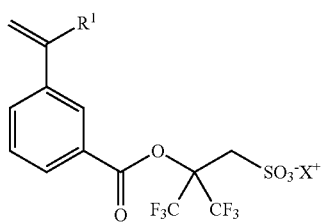
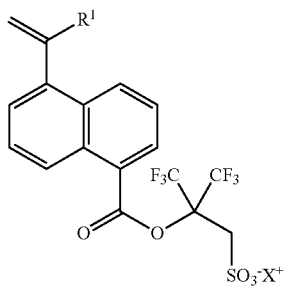
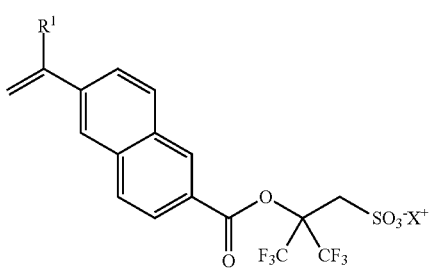
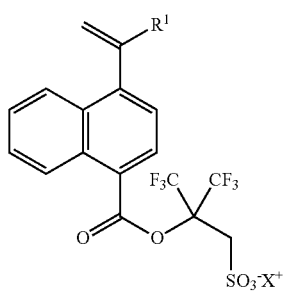

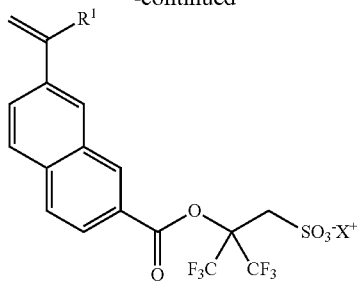

wherein $R^1$ has the same meaning as defined above; and "X" represents lithium, sodium, potassium, or a nitrogen compound.

Also, as mentioned above, the repeating unit "a" shown by the general formula (1) preferably includes one or more kinds selected from repeating units a1 to a4 respectively shown by the general formulae (3-1) to (3-4). In other words, among the monomers exemplified above, the monomers from which the repeating units a1 to a4 can be obtained are particularly preferred.

Further, as mentioned above, the polymer compound for a conductive polymer of the present invention preferably further contains the repeating unit "b" shown by the general formula (2), and a monomer from which the repeating unit "b" can be obtained may be specifically exemplified by the following,

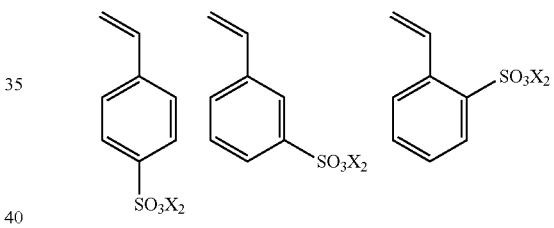

wherein, $X_2$ represents a hydrogen atom, lithium, sodium, potassium, a nitrogen compound, or a sulfonium compound.

Illustrative examples of $X_2$ which is a nitrogen compound include a compound shown by the following general formula (5),

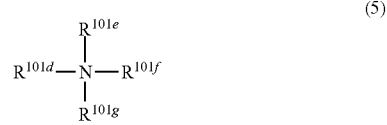

(5)

wherein $R^{101d}$, $R^{101e}$, $R^{101f}$, and $R^{101g}$ each represent a hydrogen atom, or a linear, branched, or cyclic alkyl group, alkenyl group, oxoalkyl group, or oxoalkenyl group each having 1 to 12 carbon atoms, an aryl group having 6 to 20 carbon atoms, or an aralkyl group or an aryloxoalkyl group each having 7 to 12 carbon atoms where a part or all of hydrogen atoms in these groups may be substituted by an alkoxy group(s); $R^{101d}$ and $R^{101e}$, or $R^{101d}$, $R^{101e}$, and $R^{101f}$ may form a ring together, and when the ring is formed, $R^{101d}$ and $R^{101e}$, or $R^{101d}$, $R^{101e}$, and $R^{101f}$ represent an alkylene group having 3 to 10 carbon atoms or a heteroaromatic ring having therein the nitrogen atom in the formula.

Also, as mentioned above, the polymer compound for a conductive polymer of the present invention may further contain a repeating unit "c" besides the repeating unit "a" and the repeating unit "b". Examples of the repeating unit "c" include styrene types, vinylnaphthalene types, vinylsilane types, acenaphthylene, indene, benzofuran, benzothiophene, (meth)acryl types, vinylcarbazole.

Illustrative examples of a monomer from which the repeating unit "c" can be obtained may be specifically exemplified by the following.

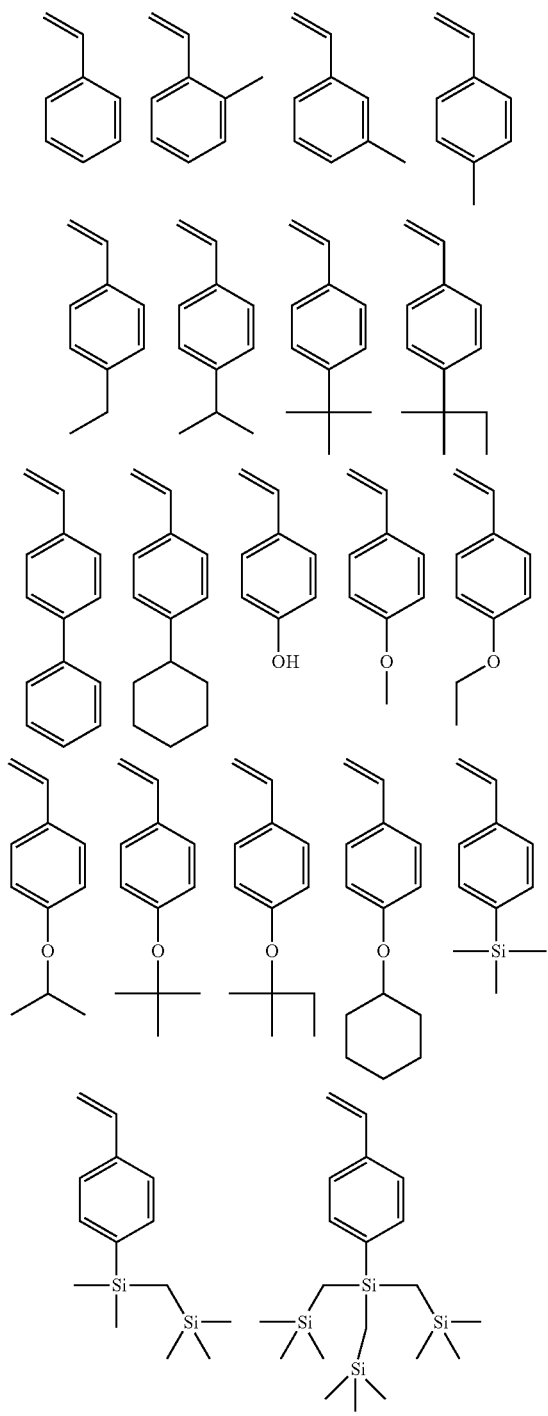

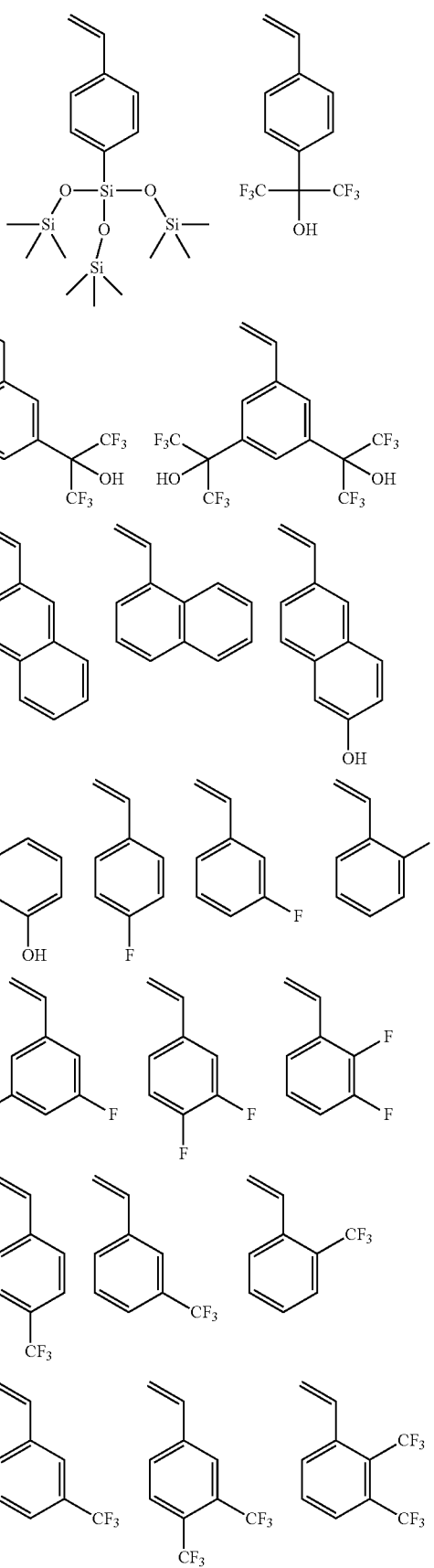

-continued
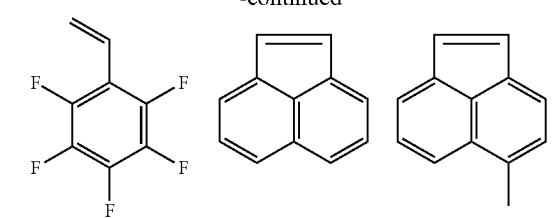
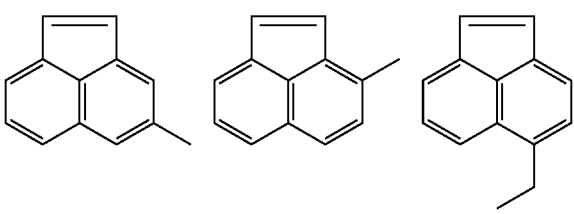
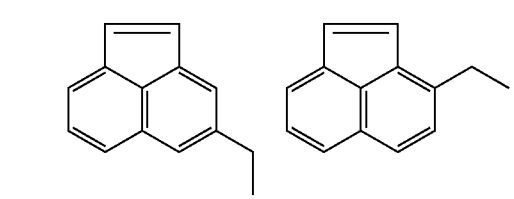
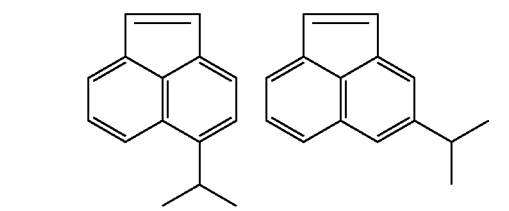
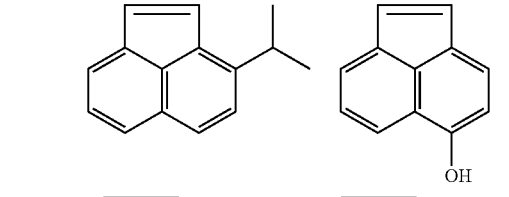
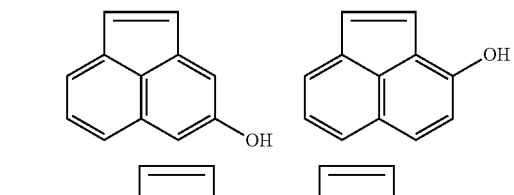
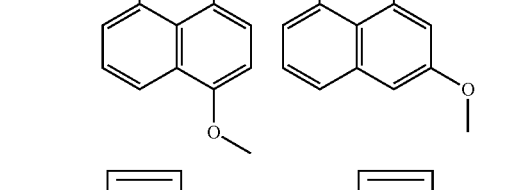
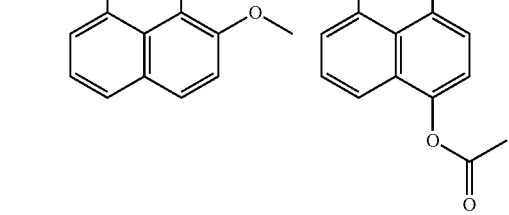
-continued
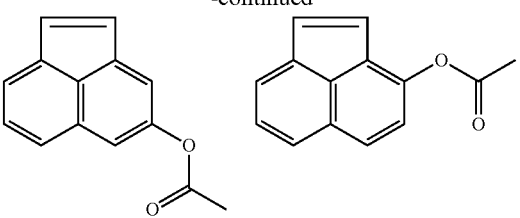
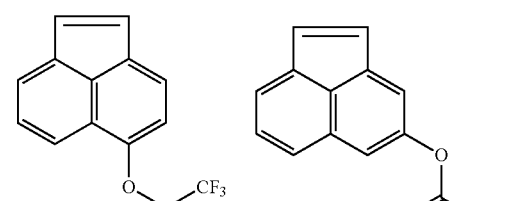
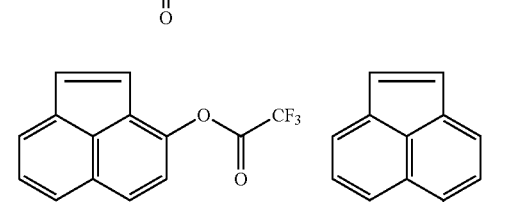
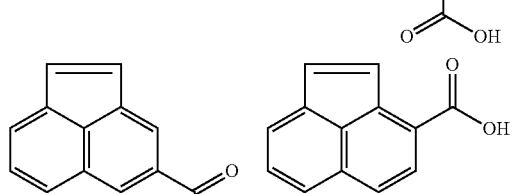
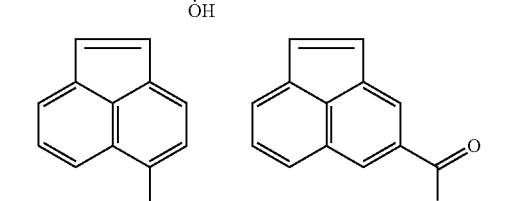
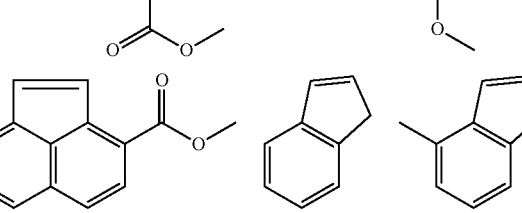
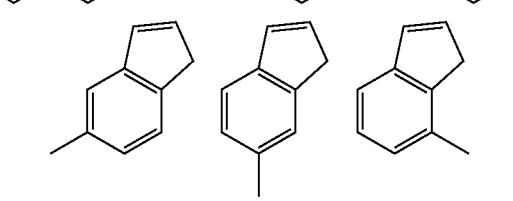
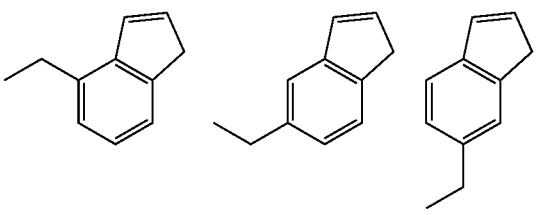

-continued
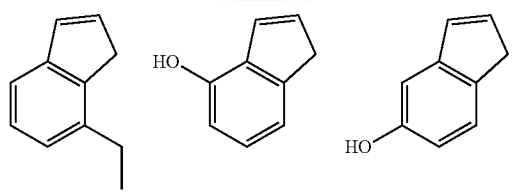
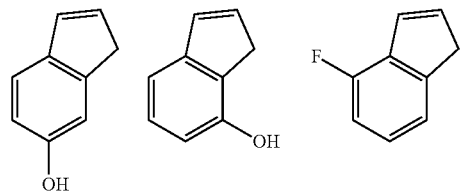
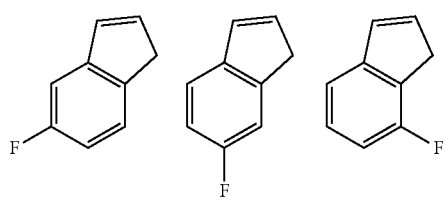
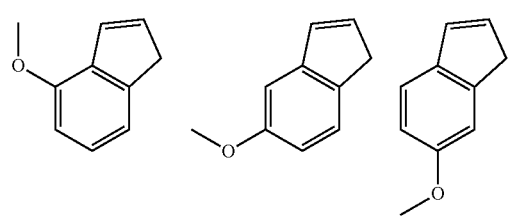
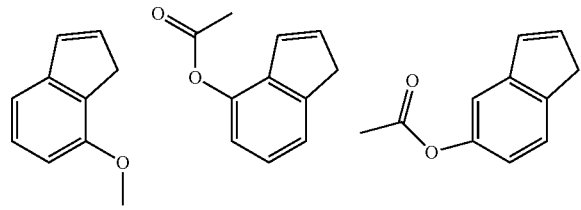
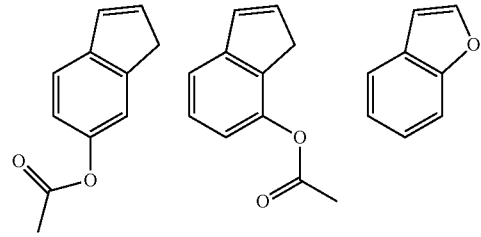
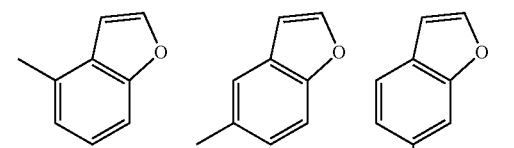
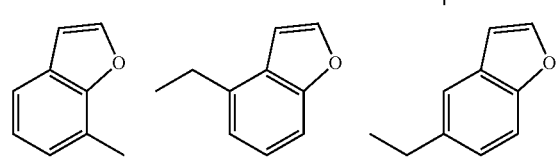
-continued
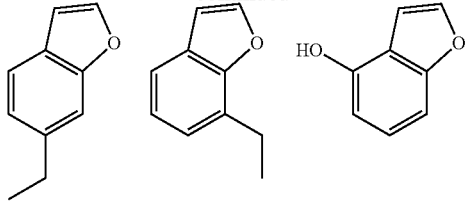
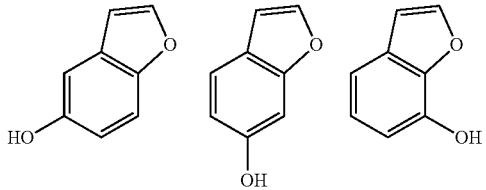
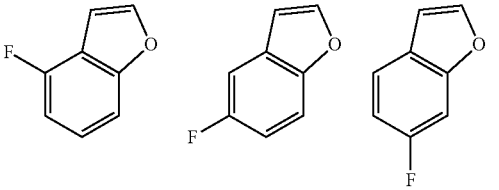
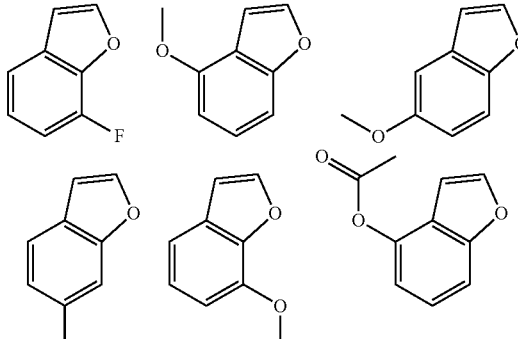
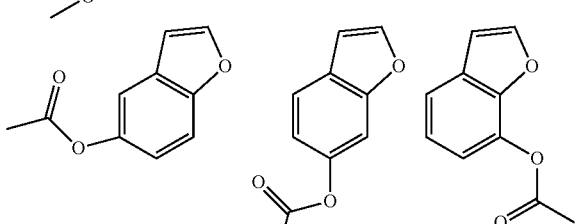
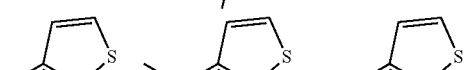
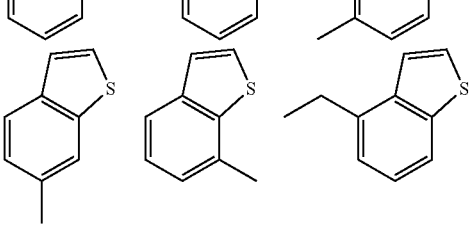
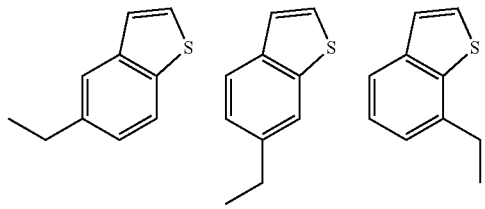

25
-continued
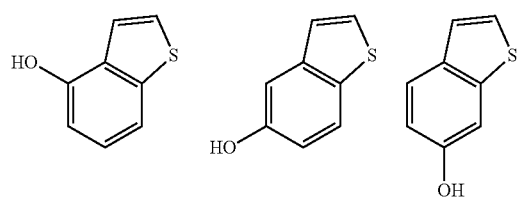
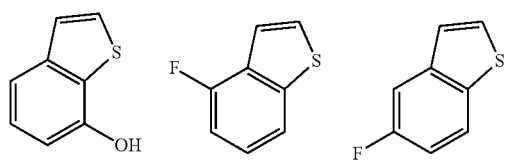
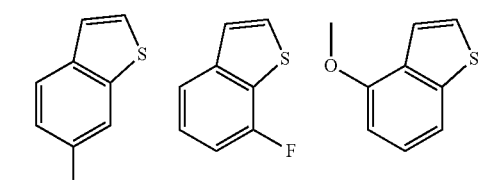
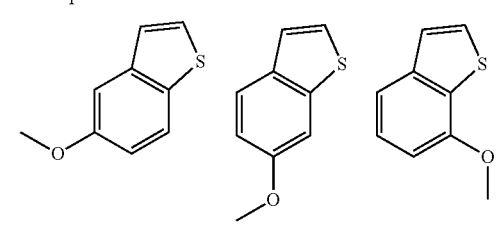
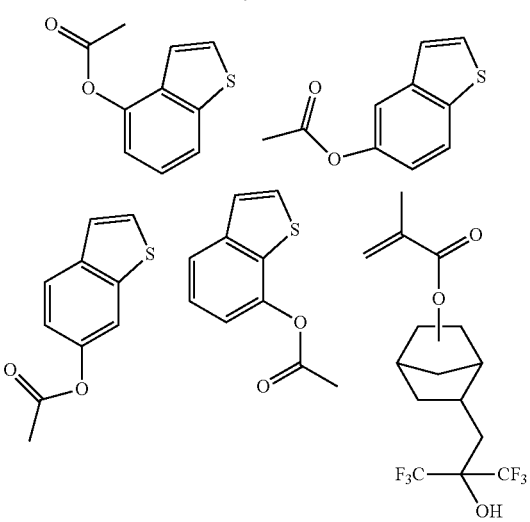
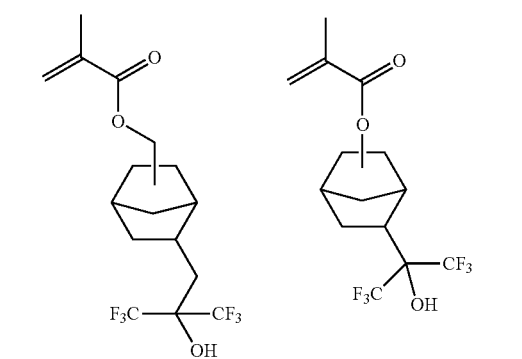
26
-continued
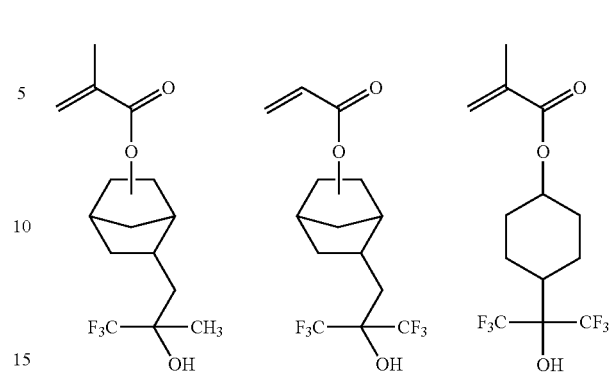
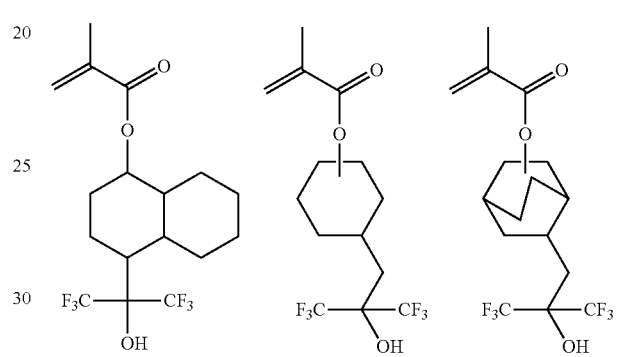
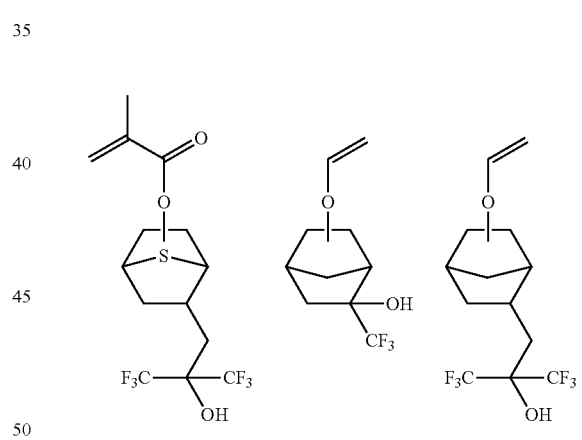
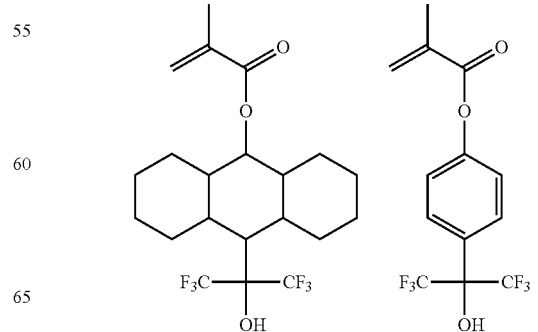

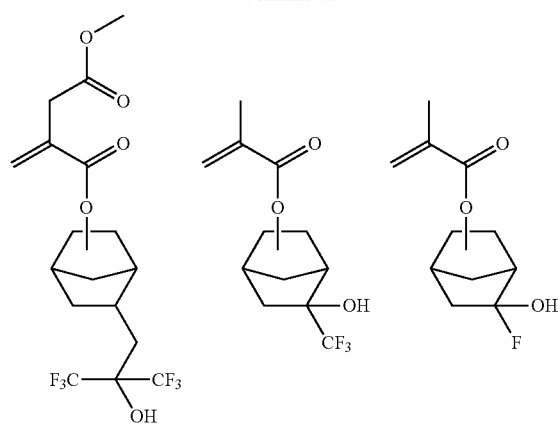
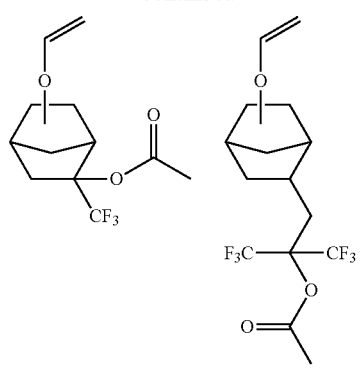
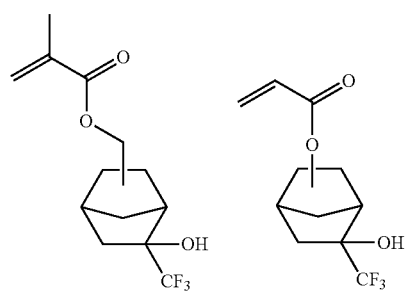
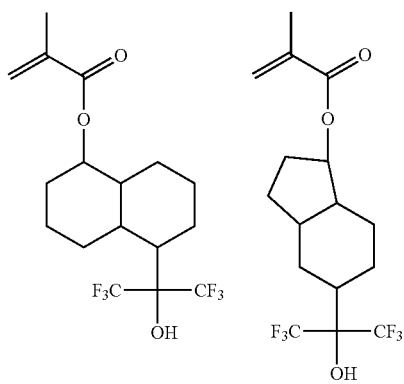
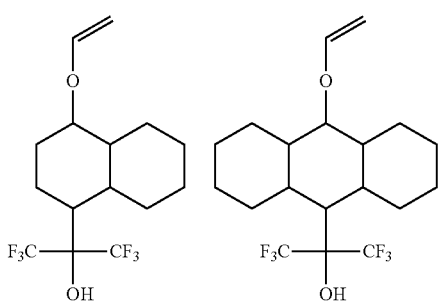
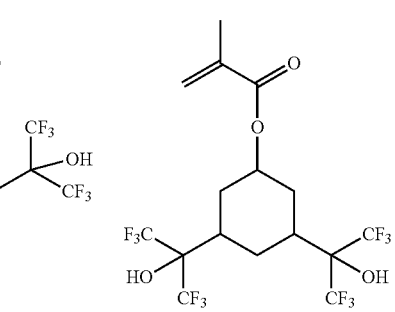
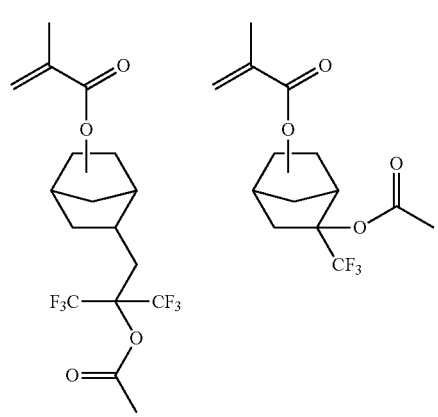
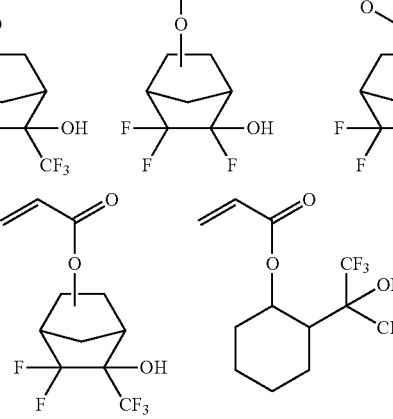

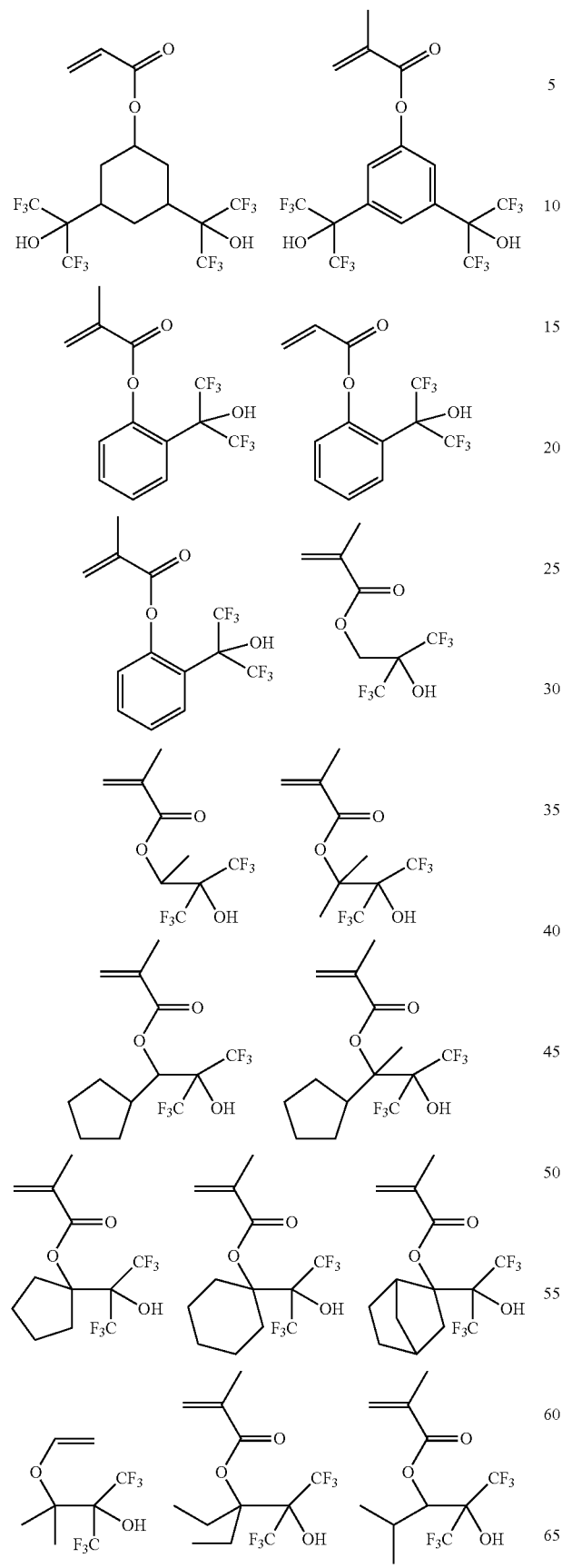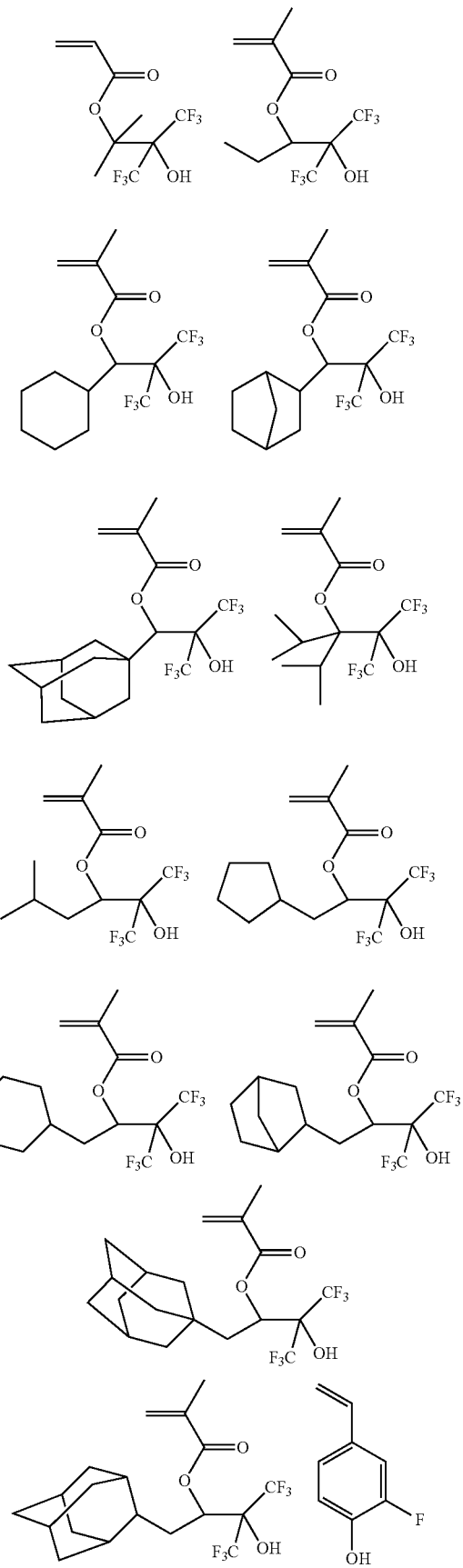

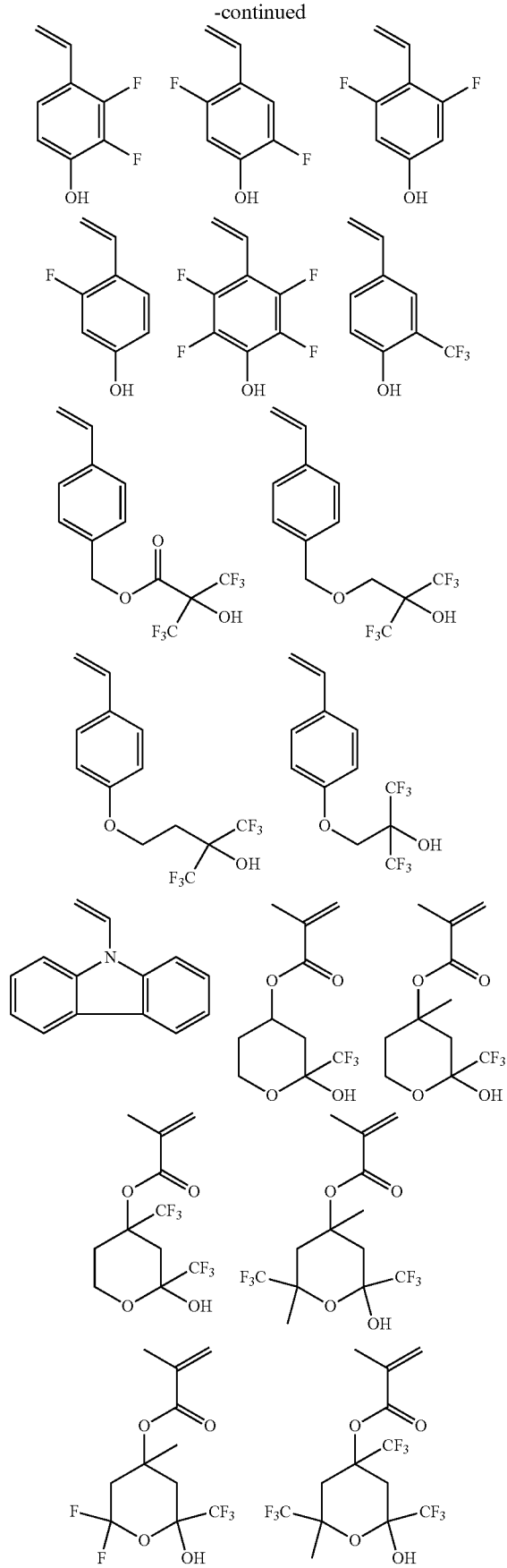
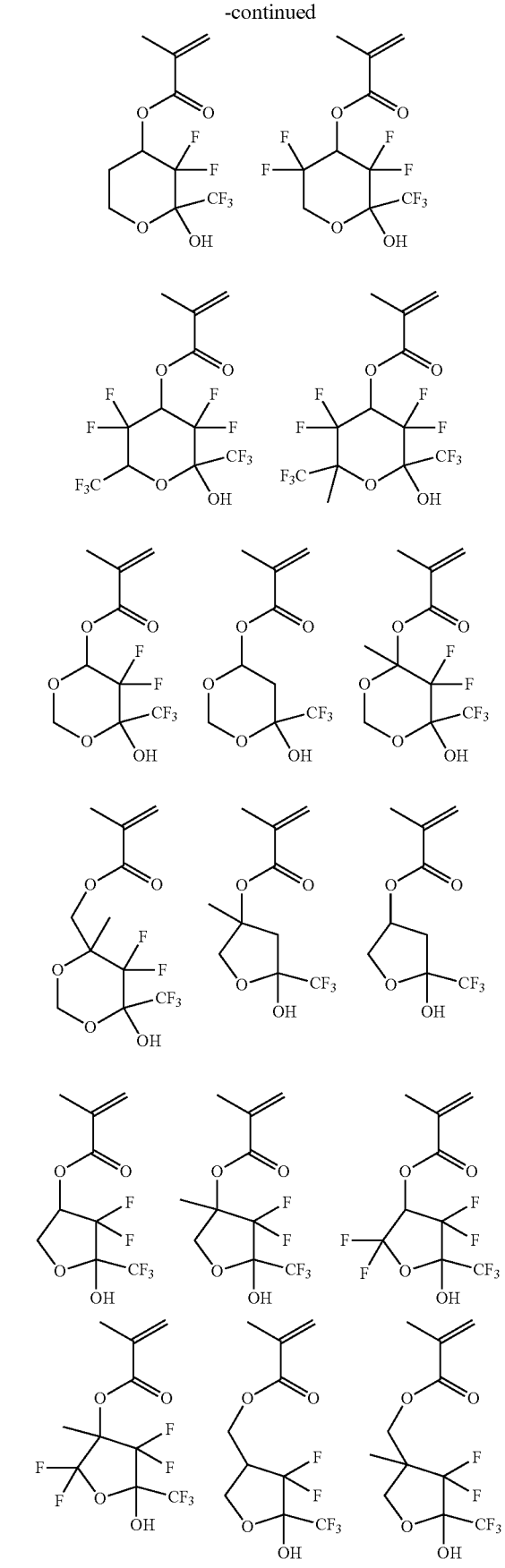

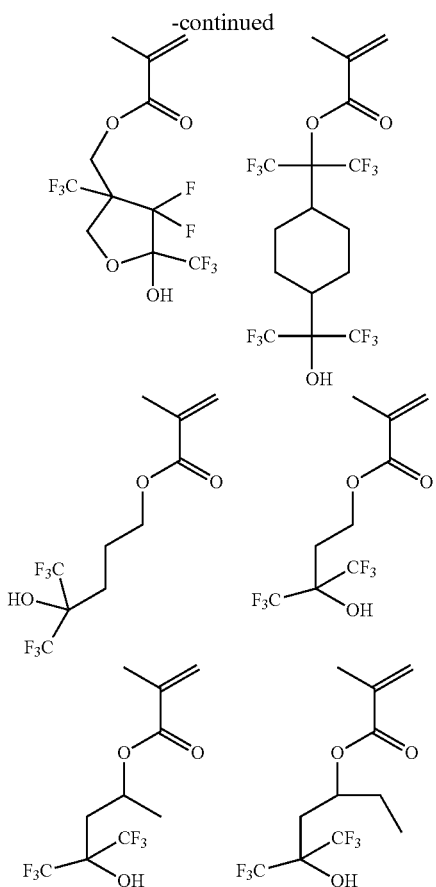

As a method for synthesizing the polymer compound for a conductive polymer of the present invention, for example, a method in which desired monomers among the above-described monomers are subjected to heat polymerization in a solvent by adding a radical polymerization initiator to obtain a polymer compound, which is a copolymer, may be mentioned.

Illustrative examples of the solvent to be used for the polymerization include water, methanol, ethanol, n-propanol, isopropyl alcohol, methoxyethanol, ethoxyethanol, n-butanol, ethylene glycol, propylene glycol, glycerin, diethylene glycol, dimethylsulfamide, dimethylacetamide, acetone, dimethyl sulfoxide, N-methylpyrrolidone, toluene, benzene, tetrahydrofuran, diethyl ether, dioxane, cyclohexane, cyclopentane, methyl ethyl ketone, and γ-butyrolactone.

Illustrative examples of the radical polymerization initiator include di-tert-butyl peroxide, dicumyl peroxide, tert-butylcumyl peroxide, benzoyl peroxide, dilauryl peroxide, cumene hydroperoxide, tert-butyl hydroperoxide, tert-butyl peroxyisobutyrate, potassium persulfate, ammonium persulfate, hydrogen peroxide, 2,2'-azobisisobutyronitrile (AIBN), 2,2'-azobis(2,4-dimethylvaleronitrile), dimethyl 2,2-azobis (2-methylpropionate), lauroyl peroxide, 2,2'-azobis(2-amidinopropane) dihydrochloride, or an alkali metal salt or an ammonium salt of 4,4'-azobis(4-cyanovaleric acid).

The reaction temperature is preferably in the range of 50 to 80° C., and the reaction time is preferably in the range of 2 to 100 hours, more preferably 5 to 20 hours.

In the polymer compound for a conductive polymer of the present invention, the monomer that gives the repeating unit "a" shown by the general formula (1) may be used alone or in combination with two or more kinds, and it is preferred to combine methacryl type and styrene type monomers for the sake of enhancing polymerizability.

In addition, two or more kinds of monomers that give the repeating unit "a" may be random-copolymerized, or may be each block-copolymerized. When a block-copolymerized polymer (block copolymer) is used as a conductive film, it can be expected to obtain a merit that the conductivity is improved by aggregating the repeating unit portions composed of the two or more kinds of the repeating units "a" with each other to form a sea-island structure.

Moreover, the monomers that give the repeating units "a" to "c" may be random-copolymerized, or may be each block-copolymerized. In this case, it can also be expected to obtain a merit that the conductivity is improved due to the block copolymer as explained for the repeating unit "a" above.

When a random copolymerization is carried out by a radical polymerization, the method is generally used in which monomers and a radical polymerization initiator to be used for the copolymerization are mixed and polymerized by heating. In the case that the polymerization is started with a first monomer in the presence of a radical polymerization initiator, and then adding a second monomer thereto, the resulting polymer has a structure that the first monomer is polymerized at one side of the polymer molecule, and the second monomer is polymerized at the other side. In this case, however, the repeating units of the first and second monomers are mixedly present at the middle portion, thus it has a different structure from the block copolymer. For forming the block copolymer by radical polymerization, living radical polymerization is preferably used.

In a living radical polymerization method called RAFT polymerization (Reversible Addition Fragmentation chain Transfer polymerization), radicals at the polymer terminal are always living, so that it is possible to form a block copolymer composed of first and second repeating units by starting the polymerization with a first monomer, and then adding a second monomer at the time when the first monomer has been consumed. In addition, it is also possible to form a triblock copolymer by starting the polymerization with a first monomer, then adding a second monomer at the time when the first monomer has been consumed, and then adding a third monomer thereto.

When the RAFT polymerization is carried out, there is a characteristic that a narrowly distributed polymer having a narrow molecular weight distribution (degree of distribution) is obtained. In particular, when the RAFT polymerization is carried out by adding monomers at once, a polymer having a narrower molecular weight distribution can be obtained.

The polymer compound for a conductive polymer of the present invention preferably has a narrow distribution, and the molecular weight distribution (Mw/Mn) thereof is preferably in the range of 1.0 to 2.0, particularly preferably 1.0 to 1.5. The narrow distribution allows to prevent unevenness of the conductivity of the conductive polymer synthesized by using the polymer compound.

To carry out the RAFT polymerization, a chain transfer agent is necessary, and illustrative examples thereof include 2-cyano-2-propylbenzothioate, 4-cyano-4-phenylcarbonothioylthiopentanoic acid, 2-cyano-2-propyldodecyltrithiocarbonate, 4-cyano-4-[(dodecylsulfanylthiocarbonyl)sulfanyl] pentanoic acid, 2-(dodecylthiocarbonothioylthio)-2-methylpropanoic acid, cyanomethyldodecylthiocarbonate, cyanomethylmethyl-(phenyl)carbamothioate, bis(thiobenzoyl)disulfide, and bis(dodecylsulfanylthiocarbonyl)disulfide. Among these, 2-cyano-2-propylbenzothioate is particularly preferred.

The proportion of the repeating units "a" to "c" is 0<a≤1.0, 0≤b<1.0, and 0≤c<1.0, preferably 0.1≤a≤0.9, 0.1≤b≤0.9, and 0≤c≤0.8, more preferably 0.2≤b≤0.8, and 0≤c≤0.5.

Also, it is preferred that a+b+c=1.

Further, when the repeating unit "a" includes one or more kinds selected from repeating units a1 to a4 as mentioned above, it is preferred that 0≤a1≤1.0, 0≤a2≤1.0, 0≤a3≤1.0, 0≤a4≤1.0, and 0<a1+a2+a3+a4≤1.0, more preferably 0≤a1≤0.9, 0≤a2≤0.9, 0≤a3≤0.9, 0≤a4≤0.9, and 0.1≤a1+a2+a3+a4≤0.9, much more preferably 0≤a1≤0.8, 0≤a2≤0.8, 0≤a3≤0.8, 0≤a4≤0.8, and 0.1≤a1+a2+a3+a4≤0.8.

In the method for producing the polymer compound for a conductive polymer of the present invention, after polymerizing monomers as mentioned above, the structure of the salt composed of a sulfonic acid residue and lithium, sodium, potassium, or a nitrogen compound is converted into a sulfo group by ion-exchange.

At this time, ion-exchange may be carried out by using, for example, an ion-exchange resin.

The polymer compound for a conductive polymer containing the repeating unit "a" shown by the general formula (1) can be easily produced by the method as mentioned above.

As mentioned above, the polymer compound for a conductive polymer of the present invention can be a polymer compound for a conductive polymer having a specific superacidic sulfo group which is soluble in an organic solvent, and suitably used for a fuel cell or a dopant for a conductive material.

When this polymer compound for a conductive polymer is used for a fuel cell, a material for a fuel cell having high dielectric constant can be obtained. Also, when this polymer compound is used as a dopant for a conjugated double bond polymer, a conductive film having high transparency, high conductivity, and high durability can be formed. The inventive polymer compound for a conductive polymer has a superacidic sulfonic-acid structure, the β-position of which has been substituted with trifluoromethyl groups, and accordingly the strong ionic bond brings a high ability as a dopant and a high stability as an ion. Therefore, this shows high conductivity and stability when used as a conductive material. Moreover, it is excellent in solubility in an organic solvent, so that deterioration of an organic EL device can be prevented by using it as a conductive film for an organic EL lighting.

Further, the producing method of the present invention facilitates producing such a polymer compound for a conductive polymer of the present invention.

EXAMPLES

In the following, the present invention is specifically explained by referring to Examples, but the present invention is not limited thereto.

In the following, monomers used in syntheses of Examples are shown.

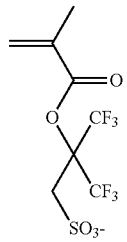
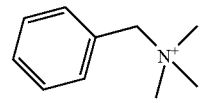

Monomer 1

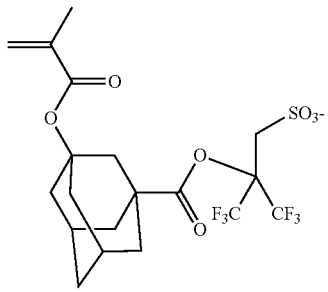

Monomer 2

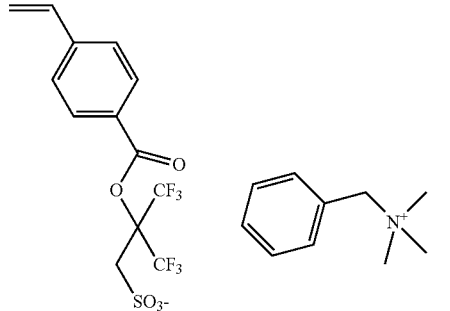

Monomer 3

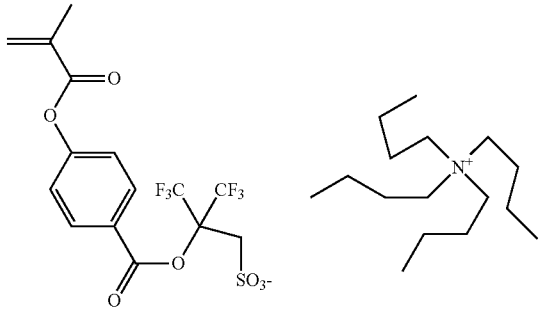

Monomer 4

Monomer 1: benzyltrimethylammonium 3,3,3-trifluoro-2-methacryloyloxy-2-trifluoromethylpropane-1-sulfonate
Monomer 2: benzyltrimethylammonium 3,3,3-trifluoro-2-(3-methacryloyloxy-1-adamantanecarbonyloxy)-2-trifluoromethylpropane-1-sulfonate
Monomer 3: benzyltrimethylammonium 3,3,3-trifluoro-2-trifluoromethyl-2-(4-vinylbenzoyloxy)propane-1-sulfonate
Monomer 4: tetrabutylammonium 3,3,3-trifluoro-2-(4-methacryloyloxy-1-benzoyloxy)-2-trifluoromethylpropane-1-sulfonate Example 1

Under nitrogen atmosphere, to 37.5 g of methanol stirred at 64° C. was added dropwise a solution in which 48.1 g of Monomer 1 and 5.13 g of dimethyl 2,2'-azobis(isobutyrate)

had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 26.2 g of a white polymer.

The obtained white polymer was dissolved in 912 g of pure water, and the ammonium salt was converted into a sulfo group by using an ion-exchange resin. When the obtained polymer was measured by $^{19}$F-NMR, $^1$H-NMR, and GPC, the following analytical results were obtained.

Weight-average molecular weight (Mw)=42,000
Molecular weight distribution (Mw/Mn)=1.61
This polymer compound was named Polymer 1.

Polymer 1

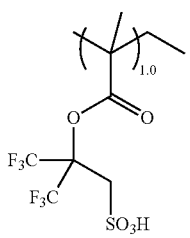

Example 2

Under nitrogen atmosphere, to 37.5 g of methanol stirred at 64° C. was added dropwise a solution in which 24.0 g of Monomer 1, 9.5 g of lithium styrenesulfonate, and 5.13 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 41.5 g of a white polymer.

The obtained white polymer was dissolved in 912 g of pure water, and the ammonium salt and the lithium salt were converted into sulfo groups by using an ion-exchange resin. When the obtained polymer was measured by $^{19}$F-NMR, $^1$H-NMR, and GPC, the following analytical results were obtained.

Copolymer Composition Ratio (Molar Ratio)
Monomer 1: styrenesulfonic acid=1:1
Weight-average molecular weight (Mw)=46,000
Molecular weight distribution (Mw/Mn)=1.76
This polymer compound was named Polymer 2.

Polymer 2

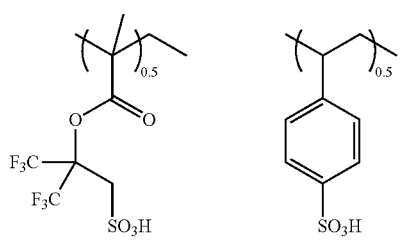

Example 3

Under nitrogen atmosphere, to 37.5 g of methanol stirred at 64° C. was added dropwise a solution in which 32.8 g of Monomer 2, 9.5 g of lithium styrenesulfonate, and 5.13 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 46.2 g of a white polymer.

The obtained white polymer was dissolved in 912 g of pure water, and the ammonium salt and the lithium salt were converted into sulfo groups by using an ion-exchange resin. When the obtained polymer was measured by $^{19}$F-NMR, $^1$H-NMR, and GPC, the following analytical results were obtained.

Copolymer Composition Ratio (Molar Ratio)
Monomer 2: styrenesulfonic acid=1:1
Weight-average molecular weight (Mw)=46,000
Molecular weight distribution (Mw/Mn)=1.52
This polymer compound was named Polymer 3.

Polymer 3

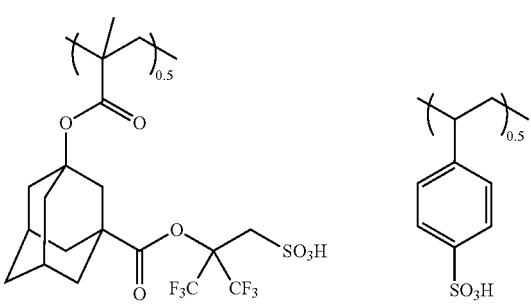

Example 4

Under nitrogen atmosphere, to 37.5 g of methanol stirred at 64° C. was added dropwise a solution in which 27.0 g of Monomer 3, 9.5 g of lithium styrenesulfonate, and 2.82 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 47.3 g of a white polymer.

The obtained white polymer was dissolved in 421 g of methanol, and the ammonium salt and the lithium salt were converted into sulfo groups by using an ion-exchange resin. When the obtained polymer was measured by $^{19}$F-NMR, $^1$H-NMR, and GPC, the following analytical results were obtained.

Copolymer Composition Ratio (Molar Ratio)
Monomer 3: styrenesulfonic acid=1:1

Weight-average molecular weight (Mw)=55,000
Molecular weight distribution (Mw/Mn)=1.81
This polymer compound was named Polymer 4.

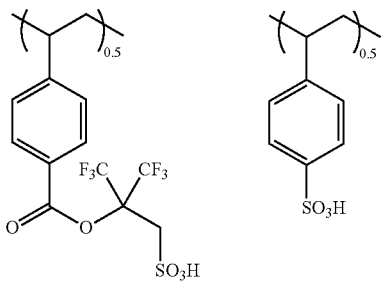

Polymer 4

Example 5

Under nitrogen atmosphere, to 37.5 g of methanol stirred at 64° C. was added dropwise a solution in which 34.6 g of Monomer 4, 9.5 g of lithium styrenesulfonate, and 2.82 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 50.2 g of a white polymer.

The obtained white polymer was dissolved in 421 g of methanol, and the ammonium salt and the lithium salt were converted into sulfo groups by using an ion-exchange resin. When the obtained polymer was measured by $^{19}$F-NMR, $^{1}$H-NMR, and GPC, the following analytical results were obtained.

Copolymer Composition Ratio (Molar Ratio)
Monomer 4: styrenesulfonic acid=1:1
Weight-average molecular weight (Mw)=56,000
Molecular weight distribution (Mw/Mn)=1.68
This polymer compound was named Polymer 5.

Polymer 5

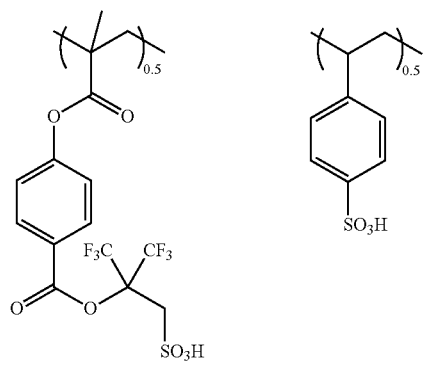

Example 6

Under nitrogen atmosphere, to 37.5 g of methanol stirred at 64° C. was added dropwise a solution in which 52.5 g of Monomer 2, 7.0 g of 4-(1,1,1,3,3,3-hexafluoro-2-propanol) styrene, and 5.13 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 43.2 g of a white polymer.

The obtained white polymer was dissolved in 912 g of pure water, and the ammonium salt was converted into a sulfo group by using an ion-exchange resin. When the obtained polymer was measured by $^{19}$F-NMR, $^{1}$H-NMR, and GPC, the following analytical results were obtained.

Copolymer Composition Ratio (Molar Ratio)
Monomer 2: 4-(1,1,1,3,3,3-hexafluoro-2-propanol)styrene=4:1
Weight-average molecular weight (Mw)=41,000
Molecular weight distribution (Mw/Mn)=1.64
This polymer compound was named Polymer 6.

Polymer 6

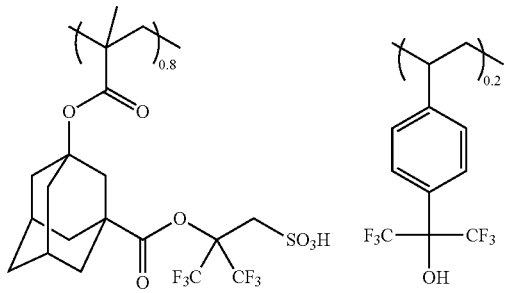

Example 7

Under nitrogen atmosphere, to 37.5 g of methanol stirred at 64° C. was added dropwise a solution in which 52.5 g of Monomer 2, 13.1 g of 3,5-bis(2-hydroxy-1,1,1,3,3,3-hexafluoro-2-propyl)cyclohexyl methacrylate, and 5.13 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 61.2 g of a white polymer.

The obtained white polymer was dissolved in 912 g of pure water, and the ammonium salt was converted into a sulfo group by using an ion-exchange resin. When the obtained polymer was measured by $^{19}$F-NMR, $^{1}$H-NMR, and GPC, the following analytical results were obtained.

Copolymer Composition Ratio (Molar Ratio)
Monomer 2: 3,5-bis(2-hydroxy-1,1,1,3,3,3-hexafluoro-2-propyl)cyclohexyl methacrylate=4:1

Weight-average molecular weight (Mw)=23,000
Molecular weight distribution (Mw/Mn)=1.61
This polymer compound was named Polymer 7.

Polymer 7

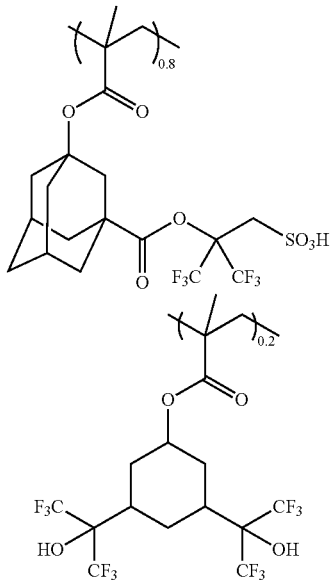

Polymers 1 to 7 synthesized as mentioned above were each soluble in water, methanol, ethanol, isopropyl alcohol, propylene glycol monomethyl ether, tetrahydrofuran, and dimethylformamide.

Thus, the producing method of the present invention facilitates producing the polymer compound for a conductive polymer of the present invention, which has a specific superacidic sulfonimide group, and is soluble in an organic solvent.

It should be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

What is claimed is:

1. A polymer compound for a conductive polymer comprising (A) one or more repeating units selected from the group consisting of the following general formulae (3-2) to (3-4), and having a weight-average molecular weight in the range of 1,000 to 500,000, (3-2)

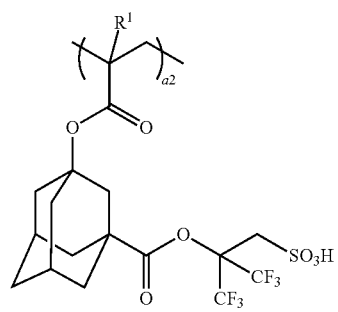

(3-3)

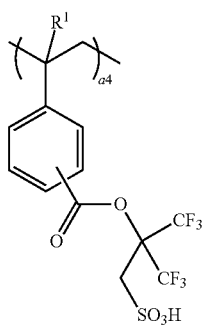

(3-4)

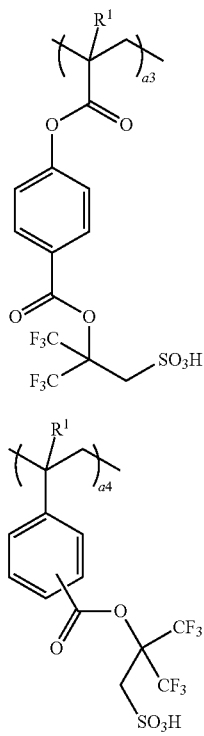

wherein $R^1$ represents a hydrogen atom or a methyl group; and a2, a3, and a4 are each a number satisfying $0 \leq a2 < 1.0$, $0 \leq a3 < 1.0$, $0 \leq a4 < 1.0$, and $0 < a2+a3+a4 < 1.0$, and (B) a repeating unit shown by the following general formula (2), (2)

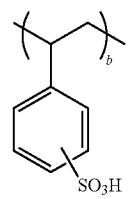

wherein "b" is a number satisfying $0 < b < 1.0$.

2. The polymer compound for a conductive polymer according to claim 1, further comprising a repeating unit shown by the following general formula (3-1):

(3-1)

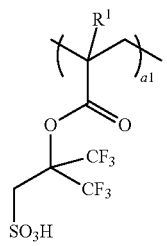

wherein a1 is a number satisfying $0 < a1 < 1.0$, and $0 < a1+a2+a3+a4 < 1.0$.

3. The polymer compound for a conductive polymer according to claim 2, wherein $0<a1<0.9$, $0\leq a2\leq 0.9$, $0\leq a3\leq 0.9$, $0\leq a4\leq 0.9$, and $0.1\leq a1+a2+a3+a4\leq 0.9$.

4. The polymer compound for a conductive polymer according to claim 2, wherein $0<a1<0.8$, $0\leq a2\leq 0.8$, $0\leq a3\leq 0.8$, $0\leq a4\leq 0.8$, and $0.2\leq a1+a2+a3+a4\leq 0.8$.

* * * * *